March 6, 1962 L. S. BENSKY ET AL 3,023,964

DIGITAL COMPUTING SYSTEMS

Filed Dec. 28, 1954 4 Sheets-Sheet 1

INVENTORS
LOWELL S. BENSKY
IVAN H. SUBLETTE

BY Morris A. Rabkin

ATTORNEY

DIGITAL COMPUTING SYSTEMS

Filed Dec. 28, 1954

4 Sheets-Sheet 2

INVENTORS
LOWELL S. BENSKY
IVAN H. SUBLETTE
BY Morris B. Rabkin
ATTORNEY

March 6, 1962 L. S. BENSKY ET AL 3,023,964

DIGITAL COMPUTING SYSTEMS

Filed Dec. 28, 1954 4 Sheets-Sheet 3

INVENTORS
LOWELL S. BENSKY
IVAN H. SUBLETTE
BY Morris A. Rabkin
ATTORNEY

March 6, 1962 L. S. BENSKY ET AL 3,023,964

DIGITAL COMPUTING SYSTEMS

Filed Dec. 28, 1954 4 Sheets-Sheet 4

INVENTORS
LOWELL S. BENSKY
IVAN H. SUBLETTE

BY Morris L. Rabkin
ATTORNEY

United States Patent Office 3,023,964

Patented Mar. 6, 1962

3,023,964

DIGITAL COMPUTING SYSTEMS

Lowell S. Bensky, Levittown, Pa., and Ivan H. Sublette, Haddonfield, N.J., assignors to Radio Corporation of America, a corporation of Delaware Filed Dec. 28, 1954, Ser. No. 478,098
22 Claims. (Cl. 235—176)

This invention relates to digital computing systems, and particularly to a system for adding and subtracting quantities of variable, non-standard maximum length.

Digital computing machines are today widely used in industry and commerce. These machines were originally developed for scientific applications. Accordingly, these machines have employed information coding systems which are particularly advantageous for scientific calculations. Presently, however, digital computing techniques and systems are becoming widely employed in other applications, such as in work of essentially commercial nature. Thus computing systems are being constructed to provide greater flexibility in representing and manipulating information of all kinds.

Coding forms have been developed which readily permit handling alphabetic characters and also special symbols. Among these forms are the binary and alpha-numeric codes. In one type of alpha-numeric code, each decimal digit from 0 to 9 may be represented by a binary number, and each desired character and special symbol may be assigned a different binary number. In such a code a multi-digit decimal number is represented by a sequence or train of successive binary numbers instead of a pure binary number. Thus, this form of coding is often called a binary-decimal code or a binary-coded decimal form.

Commercial installations require the storage and manipulation of great masses of information. Ready access to and economical storage of such information is largely dependent upon the compactness with which such information can be stored. In the prior art, each basic grouping of information such as a word (also called an item) was allotted a predetermined number of character positions, each unused position being filled with a space or blank symbol. Use of such standard word lengths, however, usually meant that the standard length adopted had to be the length of the maximum expected item and that a great deal of waste storage space might result. For greater compactness in storing information, therefore, a coding system has been evolved in which each basic information grouping is separated from others by significant symbols or combinations. This system may be said to use items of variable, non-standard maximum length. The items may be said to be non-standard because the maximum item length may be different for different items. The items may further be said to be variable because each item may not necessarily fill up the number of places allotted to it.

The use of variable, non-standard maximum length items may in turn create added problems in the processing of the information in a computing system. A system operating on such items should detect the length of an item and correctly dispose of the item according to its length. Addition and subtraction are basic mathematical operations in a computer. In adding and subtracting variable, non-standard maximum length items in binary-coded decimal form, however, many special situations are encountered which are not present in pure binary addition or subtraction or in dealing with standard length items. Moreover, the operations must be carried out rapidly and reliably and as economically as is practicable.

Therefore, an object of this invention is to provide a novel system for adding and subtracting in a digital computing system using information groupings of variable, non-standard maximum lengths.

Another object of this invention is to provide a novel arrangement for algebraically adding and subtracting quantities grouped in coded form into variable, non-standard maximum lengths.

A further object of this invention is to provide an improved arrangement for adding and subtracting in a digital computing system, which arrangement has greater flexibility and usefulness than the adding and subtracting systems heretofore employed.

Yet another object of this invention is to provide an improved system for adding or subtracting quantities arranged in binary-coded decimal form in an alpha-numeric code and grouped into items of variable, non-standard maximum length.

Still another object of this invention is to provide an improved arrangement for algebraic addition and subtraction in a binary-coded decimal digital computer employing timed sequences of operation, which arrangement has greater flexibility than the arrangements of the prior art.

Another object of this invention is to provide a novel adder and subtracter system for operating on operands having special sign and terminating symbols.

Another object of this invention is to provide a novel adder and subtracter system for operating on operands comprised of trains of characters, each operand having a sign adjacent the most significant character, and negative operands having complemented characters.

A further object of this invention is to provide a novel system for controlling addition and subtraction operations in accordance with special sign and terminating symbols occurring in the operands.

Yet another object of this invention is to provide, in an adder and subtracter system employing complements, an improved arrangement for controlling and effecting end-around-carry, which arrangement has greater flexibility than the arrangements of the prior art.

In accordance with the present invention a pair of binary-coded decimal quantities in an alpha-numeric code are added, or one is subtracted from the other, least significant character first. The most significant character of each quantity is followed by a special symbol denoting the sense of the quantity or some other special characteristic. Like order characters from each of the quantities are handled together and each pair of characters is operated on serially.

An integrated arrangement is provided for pairing the characters successively, adding or subtracting the characters, carrying remainders, storing the result of the addition or subtraction, and proceeding to the next pair of characters. The integrated arrangement includes provision for handling the relationships possible between the quantities. An addition or subtraction is carried out in a series of steps, with a timed sequence of operations occurring at each step. Also included in the arrangement are controlling circuits which recognize and utilize the special symbols following the most significant digits to achieve the desired addition or subtraction. The completion of the desired operation on both quantities is recognized and signalled when the proper final result is stored in the system.

A feature of the invention is an arrangement which separately utilizes the parts of coded characters having numerical significance and the parts having other significance. Although the entire character is employed for purposes of recognition, only the numerical portion is used in addition. The result character is derived by combining the total provided by the arithmetic operation with certain other bits.

Another feature of the invention is an arrangement which economically determines the need for and effectuates an end-around-carry. The result characters and both operands are monitored to detect end-around-carry situations. The carry is then added to the result, chiefly by the same components employed in the previous arithmetic steps.

Another feature of the invention is an arrangement which places in the result desired characters, including special symbols. The characters are placed in a temporary storage and revised and augmented as circumstances dictate.

The novel features of the invention, as well as the invention itself, both as to its organization and method of operation, will best be understood from the following description, when read in connection with the accompanying drawings, in which like reference numerals refer to like parts, and in which.

Figure 1:
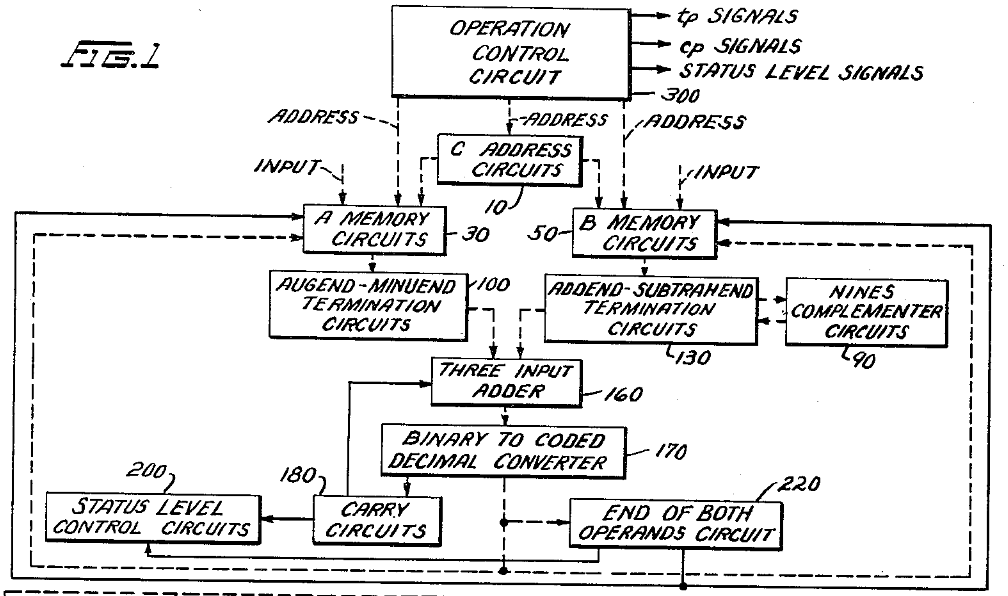
FIG. 1 is a generalized block diagram of an arrangement for practicing the invention employing, among other units, operation control circuits.
Figure 3:
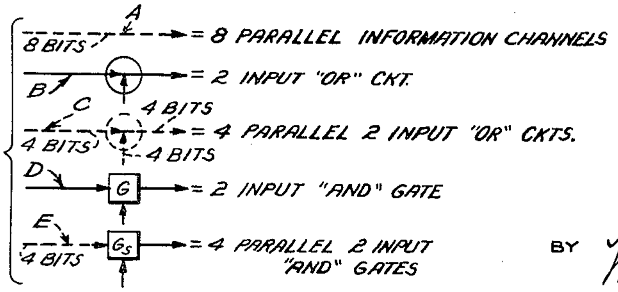
Figure 4A:
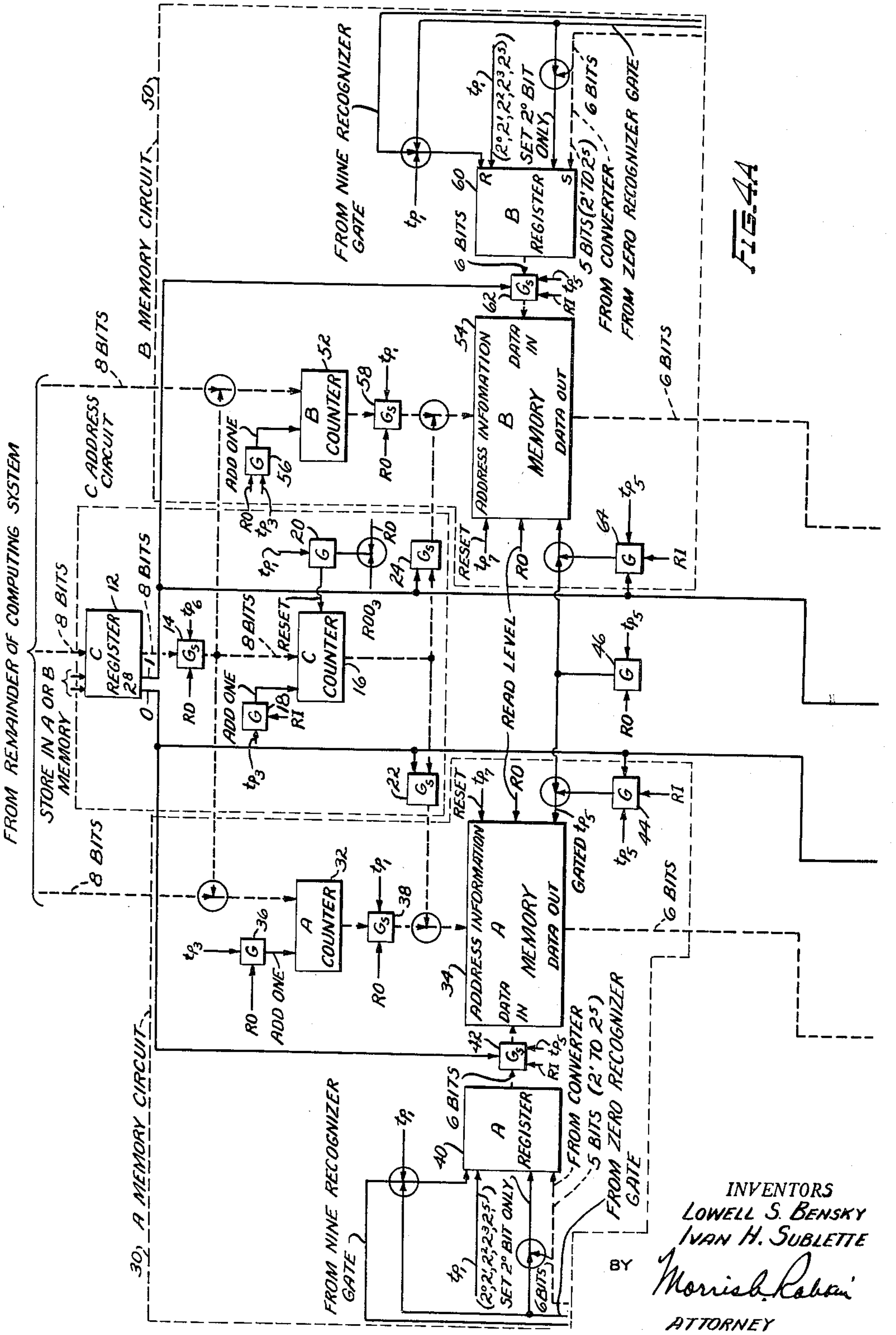
Figure 4B:
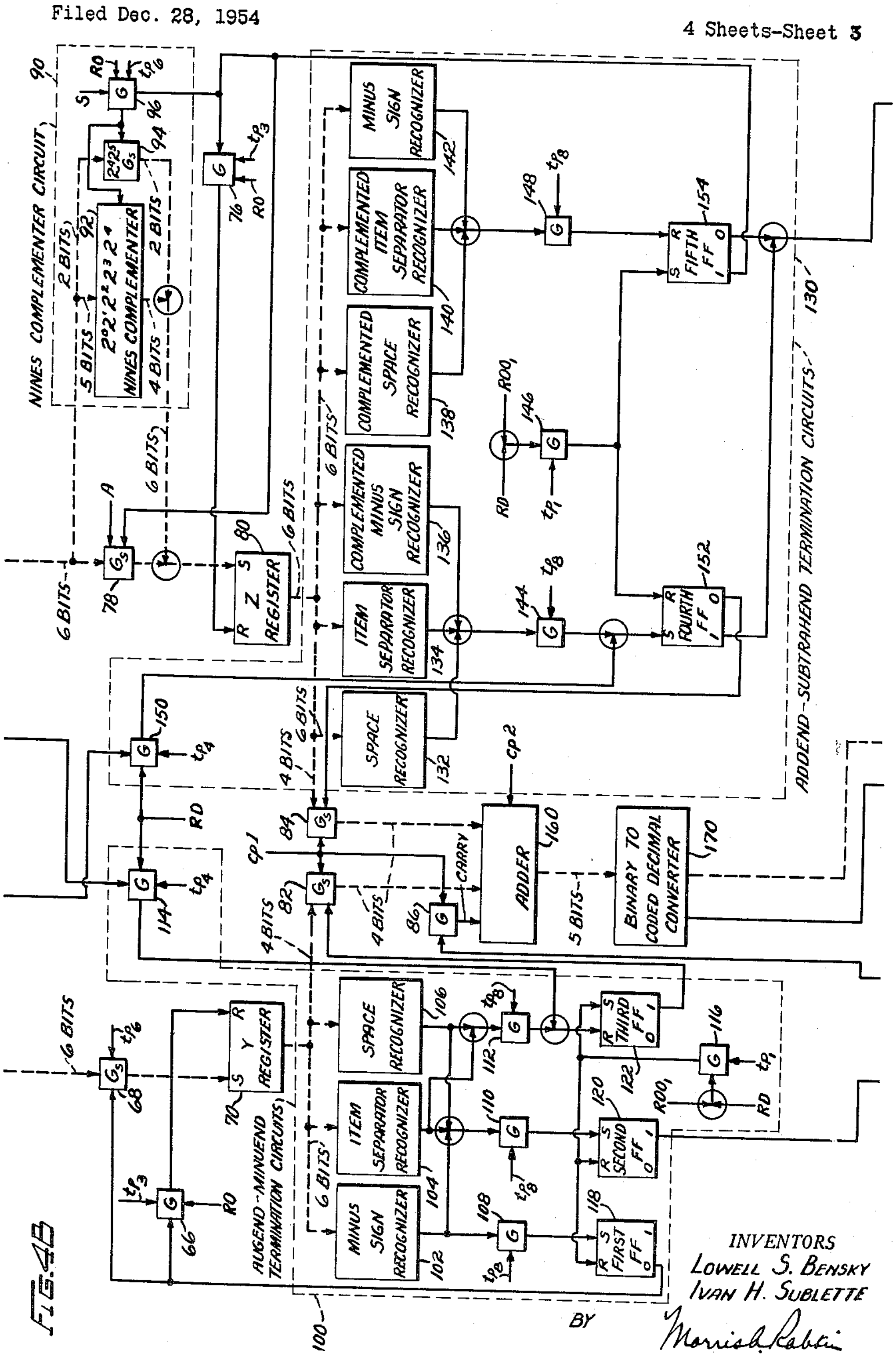
Figure 4C:
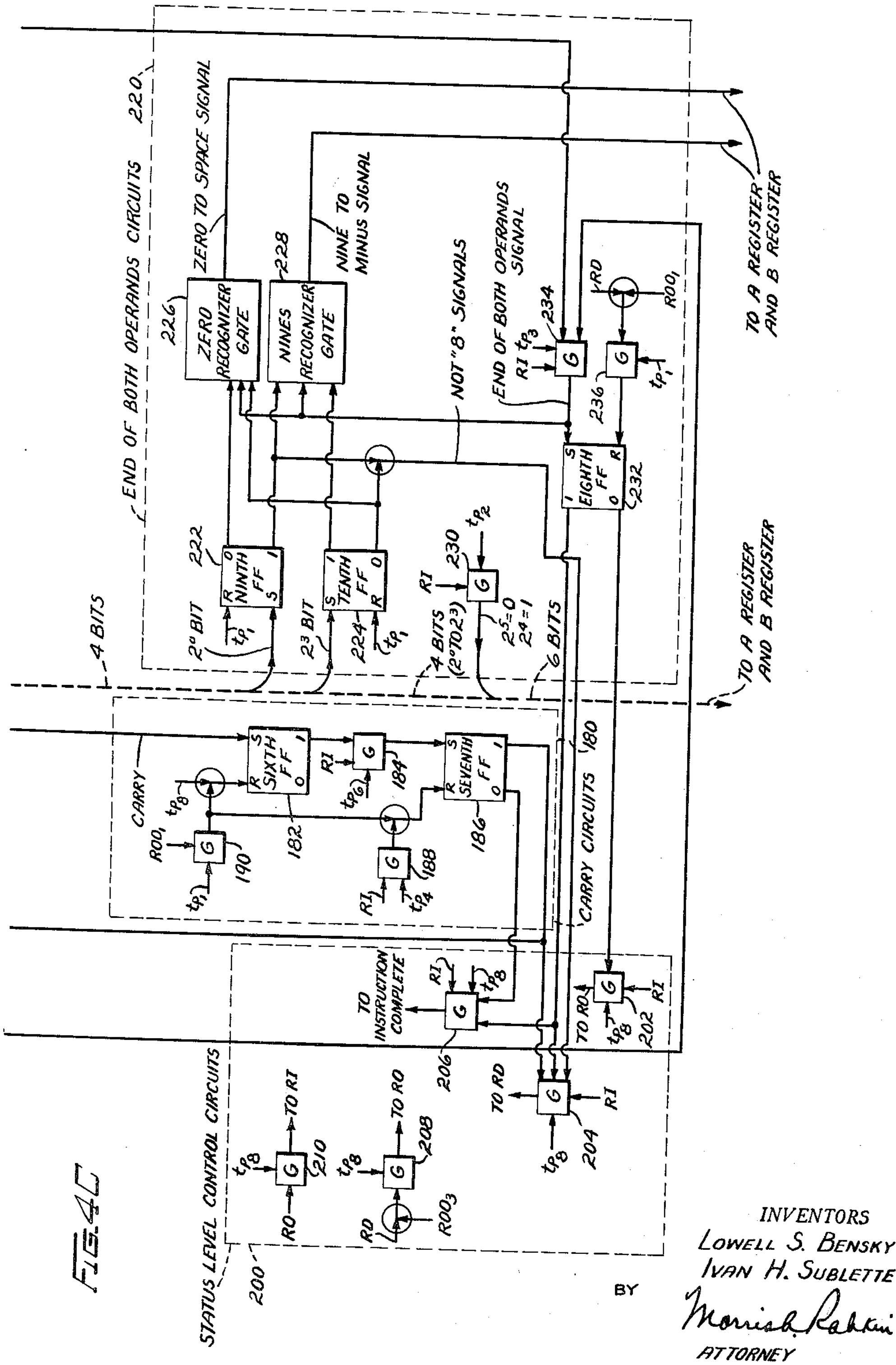

FIG. 3, comprising FIGS. 3A to 3E, is a diagram or legend of various special symbols employed in the detailed arrangement; and FIG. 4 is a block diagram showing detailed arrangements for the units generally shown in FIG. 1. FIG. 4 comprises three sheets of drawings, identified as FIGS. 4A to 4C, which when arranged together have FIG. 4A at the top, FIG. 4B below FIG. 4A, and FIG. 4C at the bottom below FIG. 4B.

INDEX

The following is an index to the principal parts of the present specification, each of which parts is similarly identified:

I. Codings Employed
II. Arithmetic Operations
III. General System Organization
IV. Timing and Status Level Signals
V. Components and Conventions Employed
VI. Detailed Arrangement
VII. Examples of Operation
(A) Addition of positive operands
(B) Subtraction of one operand from another
(C) Further situations in addition and subtraction
VIII. Conclusion

*I. Codings Employed*

To explain the invention we may assume the use of a binary-coded decimal form and an alpha-numeric code. Each character, such as a letter of the alphabet, a special symbol, or a decimal number from 0 to 9 may be represented by a six binary digit combination of which the first two digits are 01. For example:

3=01 0011
4=01 0100

Note that the binary equivalent of each decimal number is found in the four least significant digits of the binary combination. The four least significant digits, therefore, are the only digits which need be operated on when adding or subtracting numbers in this coding form. Multi-digit decimal numbers are represented by a series of coded binary equivalents. The least significant characters of a grouping are placed first, and binary digits ("bits") of like order are placed in the same digital position.

The most significant character of a grouping may be followed by a special symbol denoting the termination of a grouping (item separator symbol), or a blank (space symbol), or that the number is negative (minus symbol). Such special symbols are here termed end-of-operand symbols. The combinations for these symbols which will here be used for purposes of illustration are as follows:

Space=00 0001
Item Separator=11 1100
Minus=00 1001

*II. Arithmetic Operations*

For clarity in description the operators in an addition process, such as $A+B=C$ will be referred to as the augend (A), the addend (B), and the sum (C). The operators in a subtraction process, such as $A-B=C$, will be referred to the minuend (A), the subtrahend (B), and the difference (C).

The present system may be employed as a part of a large-scale computing system described in application Serial No. 478,021, concurrently filed by L. S. Bensky, entitled "Information Handling System."

The method of performing the arithmetic operation of subtraction which is here employed is the nines complement method, in which subtraction is performed by adding. The nines complement of an individual number is the difference between the number and nine; thus, the nines complement of two is seven. Subtraction is performed by adding the nines complement of the subtrahend to the minuend, with a simple correction. For example, to subtract two from eight, the nines complement of two, which is seven, is added to eight, giving the sum of fifteen. The correction consists of adding one, giving the sum of sixteen; and then discarding the carry, or tens digit, which results in the correct difference of six. The correction of discarding the carry digit and adding one, is sometimes called "end-around-carry."

The same method of subtraction by adding may be performed in the binary-decimal system. To subtract 0010 from 1000 (two from eight), 0111 (seven, or the complement of two) is added to 1000, giving the difference 1111. The sum is corrected, and the end-around-carry sequence is carried out, by adding one, giving the sum of 10000, and then by any equivalent of discarding the decimal carry. The method here employed is to convert the partially corrected binary sum (10000) to the binary-decimal number system (1010+0110) and to discard the tens digit (1010). The result is therefore the correct binary equivalent (0110) of decimal six.

To make the operation of addition and subtraction in the binary-coded decimal system more clear, the following examples are provided:

Addition:

$$\begin{array}{r} 123 \\ \underline{247} \\ 370 \end{array}$$

Subtraction:

$$\begin{array}{rl} 426= & 426 \\ -268= & \underline{731} \text{ (nines complement)} \\ & 1157+\text{end-around-carry} \\ = & 158 \end{array}$$

A fuller description, and further examples, will be provided in the following description of the system and its operation.

It will be noted that in the present coding system a minus sign is the same as a decimal nine in its four least significant digits. Certain other relationships observed in the coding in regard to item separator symbols and space symbols will be later explained. It should be noted, however, that the employment of nines complement coding and the end-around-carry operation are well known in the digital computing art.

*III. General System Organization*

For a better understanding of the general operation of the system a generalized arrangement (refer to FIG. 1) has been included. The quantities which are to be added and addressed for such quantities are provided from a computing system (not shown) employed for arithmetic processes. The computing system may be of the type described in the concurrently filed Bensky application and accordingly a detailed description of a computing system has not been included here. Status level, *tp*, and *cp* signals are derived from operation control circuits 300, a fuller description of which is provided with reference to FIG. 2.

The computing system (not shown) provides input characters and addresses for the input characters to A and B memory circuits 30 and 50, respectively. The A memory circuits 30 receive and store augend and minuend quantities while the B memory circuits 50 receive and store addend and subtrahend quantities, in this example. The remainder of the computing system (not shown) also provides addresses to C address circuits 10 which are coupled to both the A and B memory circuits 30, 50 and which may operate to address either of those two memory circuits 30, 50.

To avoid undue complication of the specification detailed descriptions of various counters, registers, and memory circuits used in the system have not been included. Suitable counters, registers, and memory circuits are known in the computing arts. The counters may consist, for example, of a chain of bistable multivibrators. The multivibrators or flip-flops may be set to represent a desired count by the application of a given input signal to each multivibrator of the chain. The chain of multivibrators may also count signals provided at a single trigger input. Registers, which are one form of information staticizer, likewise may comprise a group of bistable multivibrators, or flip-flops. The registers, however, may be in an essentially parallel arrangement, so far as the operations herein described are concerned, and not coupled in a chain. For purposes of illustration, we will assume here that each of the memory or data storage circuits can select a character storage position in response to a binary input and can store a desired signal combination in the previously mentioned alpha-numeric code. The address applied to a memory is assumed to consist of eight digit binary numbers and each character is assumed to consist of six binary digits.

From the A memory circuits 30 the augend or minuend to be handled passes through augend-minuend termination circuits 100 to one set of inputs of a three input adder 160. The augend-minuend termination circuits 100 include character recognizers which provide outputs on the occurrence of predetermined signal combinations. An example of a code recognizer which may be employed for performing this function is shown and described in a copending application for patent entitled "Data Selection Device," Serial No. 431,627, now Patent No. 2,926,337, filed by L. A. Fernandez Rivas on May 24, 1954, and assigned to the assignee of the present invention (refer particularly to FIG. 3). The adder 160 as here employed adds two, four binary digit inputs and a one binary digit carry input. For each binary digital position there may be employed a three input adder of the type shown at pages 276–277 of the book "High Speed Computing Devices," written by the Staff of Engineering Research Associates, Inc., and published (1950) by the McGraw-Hill Book Company, Inc.

The adder 160 provides a pure binary sum or difference to a binary to coded decimal converter 170 which converts the pure binary quantity to the binary-decimal code. An example of a binary to coded decimal converter 170 is shown and described in a copending application for patent entitled "A Code Converter," Serial No. 312,528, now abandoned, filed October 1, 1952 by I. H. Sublette and A. M. Spielberg, and assigned to the assignee of the present invention.

The addend or subtrahend which is to be operated on by the three input adder is provided from the B memory circuits 50 through addend-subtrahend termination circuits 30 which include character recognizer circuits. The addend-subtrahend termination circuits 130 are also coupled to nines complementer circuits 90 including a nines complementer for providing the nines complement of any multi-digit binary input. An example of a nines complementer which may be employed is shown and described in a copending application for patent entitled "Code Converter System," Serial No. 337,572, now Patent No. 2,798,667, filed February 18, 1953 by A. M. Spielberg and I. H. Sublette, and assigned to the assignee of the present invention. The nines complementer circuits 90 work with the addend-subtrahend termination circuits 130 in controlling the flow of information from the B memory circuits 50 to the three input adder 160.

The output of the binary to coded decimal converter 170 is provided to each of the memory circuits 30, 50. In addition, carry outputs from the binary to coded decimal converter 170 are provided through carry circuits 180 to the adder 160. Circuits which recognize the termination of both quantities, termed "end of both operands" circuits 220, are also coupled to the converter 170.

The carry circuits 180 and the end of both operand circuits 220 also provide signals to status level control circuits 200. Further signals are directed from the end of both operand circuits 220 to each of the A and B memory circuits 30 and 50, respectively.

The above designations of circuits within the system have been given for descriptive purposes. The system, however, operates in a highly integrated fashion and such designations are not intended to establish precise relationships. Certain parts of the various circuits which include more than one element are encircled by dotted lines and are correspondingly identified in the detailed arrangement of FIG. 4.

A computing system (not shown) may provide multichannel signals to locate in the memories 30, 50 the address of the augend or minuend and the addend or subtrahend, and the address to which the sum or difference is to be returned. Input signals representing the quantities which are to be operated upon will be assumed to have been stored by a computing system in the memories 30, 50 prior to an operation.

*IV. Timing and Status Level Signals*

The operation control circuits 300 (refer now to FIG. 2) provide a number of signals which control both the sequence of operations to be performed and the timing of the operations. Similar signals are provided in the operation of the concurrently filed Bensky application referred to above. The operation control circuits 300 shown here are simplified arrangements to illustrate the operation of the present system. Signals which establish different stages of the sequence are termed status level signals and have been given the designations $ROO_1$, $ROO_2$, $ROO_3$, RO, RI, and RD. In addition the operation control circuits 300 provide timing pulses in a regular sequence, identified as *tp*1 to *tp*8. From the status level signals and the timing pulses special clock pulses, *cp*1 and *cp*2, are provided. The computing system itself directs whether a subtraction or addition is to be performed, and provides subtraction (S) or addition (A) signals.

Figure 2:
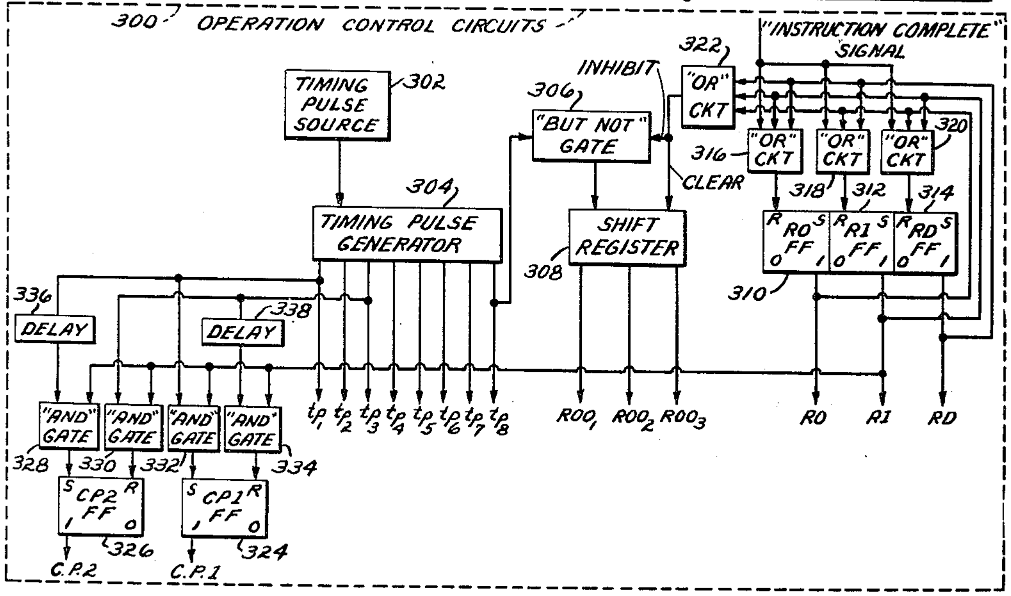
FIG. 2 is a block diagram of one arrangement which may be employed within the block denoted as operation control circuits in FIG. 1.

One arrangement for generating the desired timing pulses, status level signals, and clock pulses is that shown in FIG. 2. Signals originate from a timed pulse source 302. The timed pulse source 302, which may be a magnetic drum or a standard frequency oscillator, actuates a timing pulse generator 304. In the interval between successive pulses from the timed pulse source 302 the timing pulse generator 304 provides a sequence of regularly spaced timing pulses, from *tp*1 to *tp*8, each on a different output line. *tp*8 signals are directed through a "but not" gate 306 to the input of a shift register 308 having three outputs. As is well known, a shift register may have a number of storage positions and successively advance a stored signal one position in response to each of a series of input signals. Here the shift register 308 has three stages and advances with each $tp8$ applied to provide steady state signals from $ROO_1$ to $ROO_2$ and then to $ROO_3$. Only one of the ROO status level signals and the RO, RI, or RD status level signals is provided at a given time. Accordingly, the RO, RI, and RD signals may be provided by a group of three parallel bistable multivibrators, termed the RO, RI, and RD flip-flops 310, 312, 314, respectively. Binary "1" outputs from each of these three multivibrators 310, 312, 314 provide the desired status level signals. To prevent concurrent status level signals of the ROO sequence the "1" outputs of each of the RO, RI, and RD flip-flops 310, 312, 314 are directed to the inhibit input of the "but note" gate 306 and to the clear input of the shift register 308. As soon as a binary "1" signal is provided from one of the three flip-flops 310, 312, 314 further $tp8$ signals are therefore inhibited from passing the "but not" gate 306 and the shift register 308 is cleared.

Only one of the RO, RI, and RD signals is to be provided at a time and none are to be provided after the occurrence of an "instruction complete" signal. Accordingly, different "or" circuits 316, 318, 320 are coupled to the reset inputs of each of the RO, RI, and RD flip-flops 310, 312, 314. "Instruction complete" input signals are applied to each of the three "or" circuits 316, 318, 320. Each "or" circuit 316, 318, or 320 is also responsive to "1" outputs from the three flip-flops 310, 312, or 314 to which it does not provide input signals. Thus the three flip-flops 310, 312, or 314 operate exclusively of each other.

It is also desired to provide two clock signals, here called $cp1$ and $cp2$, during the occurrence of each RI status level. For this purpose two bistable multivibrators, called the $cp1$ and $cp2$ flip-flops 324, 326, respectively and four two input "and" gates 328, 330, 332, 334 are employed. The output of each of the "and" gates 328 to 334 is applied to a different input of one of the $cp1$ and $cp2$ flip-flops 324, 326. Each of the "and" gates has one input responsive to RI status level signals from the RI flip-flop 312. The $cp1$ flip-flop 324 provides a "1" output ($cp1$) during the RI status level from the start of $tp1$ to the end of $tp3$. The $cp2$ flip-flop 326 provides a "1" output ($cp2$) from the end of $tp1$ to the start of $tp3$ during the RI status level. Thus an undelayed $tp1$ is applied to the remaining input of the "and" gate coupled to the set input of the $cp1$ flip-flop 324. The $tp3$ signal, delayed approximately the pulse duration of $tp3$ in a delay line 338, is applied to the remaining input of the "and" gate 332 coupled to the reset input of the $cp1$ flip-flop 324. Because both these last mentioned "and" gates 332, 334 are activated (primed) by RI status level signals, undelayed $tp1$ signals set and delayed $tp3$ signals reset the $cp1$ flip-flop 324. A "1" output ($cp1$) is provided from the $cp1$ flip-flop 324, therefore, only during the interval between $tp1$ and the delayed $tp3$.

Signals are applied in a similar pattern and with a similar arrangement to generate $cp2$ signals from the $cp2$ flip-flop 326. For $cp2$, however, $tp1$ signals are delayed but $tp3$ signals are not. $cp2$ signals therefore are provided from the $cp2$ flip-flop 326 only during the shorter interval between the end of $tp1$ and the occurrence of $tp3$. The delay of $tp1$ provided by the delay line 336 is approximately equal to the duration of the timing pulses. Note that when the RI signal is not provided none of the "and" gates 328, 330, 332, 334 are primed and neither of the $cp$ flip-flops 324, 326 provide clock pulse outputs.

*V. Components and Conventions Employed*

The component circuits which are employed include bistable multivibrators or flip-flops, "and" gates, and "or" circuits. A bistable multivibrator, may have two sections and two stable conditions of operation. In a first stable condition of operation one of the sections provides a high level signal and the other section provides a low level signal. In the second stable condition of operation the signals are reversed. Here each multivibrator has been designated as having a reset (R) input and a "0" output in one section and a set (S) input and a "1" output in the other section. In the usual case a multivibrator is set to a "1" output and reset to a "0" output.

"And" gates, sometimes called coincidence gates, have a plurality of inputs and provide an output signal when and only when signals are present on each of the inputs. A "but not" gate (referred to in connection with FIG. 2) is a modification of an "and" gate which has an inhibit input. The presence of an inhibit signal on the inhibit input of the "but not" gate disables the gate from providing an output. An "or" circuit, sometimes referred to as a mixer, may have a plurality of inputs but provides an output when signals are present on any one or more of its inputs.

Certain conventions (refer now to FIG. 3) have been adopted here to simplify explanation of the arrangement. As shown in FIG. 3A the use of a broken line with an adjacent numerical designation indicates a certain number of parallel information channels. Conductor lines which come together at a point and terminate in arrows surrounded by a circle (FIG. 3B) designate an "or" circuit. A similar designation, but with broken lines (FIG. 3C), designates a number of parallel "or" circuits. An "and" gate is represented simply by a rectangle having an inner G (FIG. 3D). A number of parallel "and" gates are represented by a rectangle having an inner G*s* and having one broken line input (FIG. 3E). In addition the detailed diagram of the system includes explanatory designations when one or more of a number of information channels are used in a distinctive manner.

*VI. Detailed Arrangement*

The detailed arrangement of the component units of the system are shown in FIG. 4. With reference to FIG. 4 (more specifically FIGS. 4A, 4B, and 4C), the general path of information flow can be traced by following the path of the broken lines representing multi-channel conductors. Information may be placed in a C register 12 (FIG. 4A) and a C counter 16 in the C address circuits 10, an A counter 32 in the A memory circuits 30, and a B counter 52 in the B memory circuits 50.

In the A memory circuits 30, which may also be termed the augend side of the arrangement, augend or minuend address information may be directed to the A counter 32. The A counter 32 and a flip-flop register A 40, hereinafter designated as the A register 40, control an A memory 34 which in turn provides information to a flip-flop register Y (Y register) 70 (FIG. 4B). A correspondence may be made between certain of the units of this application and certain of the units employed in the system of the concurrently filed Bensky application mentioned above. The A register 40 and B register 60 of this application, for example, correspond to the L register 18 and R register 19 of the Bensky application. Similarly, the A memory 34 and B memory 54 herein correspond to HSML 15 and HSMR 16 in the Bensky application. Y and Z registers are employed and so designated in both applications.

Within the B memory circuits 50 (FIG. 4A), which may also be called the addend side of the arrangement, addend or subtrahend address information may be provided to a B counter 52. The B counter 52 and a flip-flop register B (B register) 60 control the B memory 54. The B memory 54 provides information to a flip-flop register Z (Z register) 80 (FIG. 4B). The C counter 16 (FIG. 4A) is coupled to provide optional control of either the A memory 34 or the B memory 54.

Again on the augend side, information from FFR D70 (FIG. 4B) is directed to the augend-minuend termination circuits 100 and to the three input adder 160. Within the augend-minuend termination circuits 100 the information is provided to a minus sign recognizer 102, an item separator recognizer 104, and a space recognizer 106. The three recognizers 102, 104, 106 just mentioned control the set inputs of three flip-flops here identified as the first FF 118, the second FF 120, and the third FF 122.

On the addend side of the arrangement, information is provided from the B memory 54 (FIG. 4A) to the nines complementer circuits 90 (FIG. 4B) and also to the Z register 80. From the Z register 80 the information is provided to the addend-subtrahend termination circuits 130 and to the adder 160. Within the addend-subtrahend termination circuits 130 information is provided from FFR E80 to each of six code recognizers: (1) a space recognizer 132, (2) an item separator recognizer 134, (3) a complemented minus sign recognizer 136, (4) a complemented space recognizer 138, (5) a complemented item separator recognizer 140, and (6) a minus sign recognizer 142. These six code recognizers 132 to 142 provide signals to the set inputs of two flip-flops, here termed the fourth FF 152 and the fifth FF 154.

From the adder 160 the information goes through the binary to coded decimal converter 170 and then back to the A register 40 (FIG. 4A) and the B register 60 in the A and B memory circuits 30 and 50, respectively. The information is also provided to the end of both operands circuits 220 (FIG. 4C) to control the set inputs of two flip-flops, here called the ninth FF 222 and the tenth FF 224. These two last mentioned flip-flops 222, 224 control a zero recognizer gate 226 and a nine recognizer gate 228 in the end of both operands circuits 220.

Carry signals from the binary to coded decimal converter 170 (FIG. 4B) are sent back through the carry circuits 180 (FIG. 4C), including a sixth FF 182 and a seventh FF 186, to the adder 160 (FIG. 4B).

The operation of the various "and" gates used in the system will become apparent as the operation of the system is described. The "or" circuits, however, are shown where employed but not numbered or described in detail.

For descriptive purposes, the "and" gates may be said to perform one or more of several functions in the system. These functions are: (1) testing for and signalling the existence of given conditions as shown by the coincidence of given input signals; (2) coupling one unit to another at a given time to provide a sequential signal flow between the units of the system, and (3) resetting units of the system such as flip-flops to a starting condition.

The quantities to be operated on are provided separately to the A memory 34 (FIG. 4A) and the B memory 54. In accordance with the program, the computer "knows" where these quantities are, which quantity is wanted, and where the result of an operation is to be located. As stated previously, augends and minuends are placed in the A memory 34 and subtrahends and addends are placed in the B memory 54. The least significant character of a quantity may be placed at the lowest address number in a memory, and each succeeding character is placed at a one higher address number. The remainder of the computing system provides an S or A signal, in response to the program instruction, depending upon whether the operation is to be subtraction or addition, respectively. As described in conjunction with FIG. 2, the various timing pulses, clock pulses, and status level signals are also provided.

*Status level* $ROO_1$.—The detailed arrangement will be described with reference to the manner in which the various "and" gates provide their individual coupling, testing, and reset functions from status level to status level and during the successive timing pulses within each status level. The description will therefore proceed from *tp*1 to *tp*8 within the successive status levels $ROO_1$, $ROO_2$, $ROO_3$, RO, RI, and RD.

The ROO status levels are employed herein for setting in the desired address information and placing the system in a starting condition.

In commencing an operation, after the desired quantities have been stored at desired points in the A and B memories 34 and 54, the addresses of the operands and of the result are placed into the system. One eight bit address (augend or minuend) is placed in the A counter 32, another eight bit address (addend or subtrahend) is placed in the B counter 52 and the third eight bit address (sum or difference) is placed in the C register 12 and the C counter 16. An additional ninth bit ($2^8$ bit) is stored in the C register 12 to control whether the result of the operation is to be stored in the A or the B memory 32 or 52.

At *tp*1 in status level $ROO_1$ G146 (FIG. 4B) provides an output to reset the fourth FF 152 and the fifth FF 154 in the addend-subtrahend termination circuits 130. Similarly, G116 is fully activated and provides an output to reset the first FF 118, the second FF 120, and the third FF 122 in the augend-minuend termination circuits 100. The sixth FF 182 (FIG. 4C) and the seventh FF 184 in the carry circuits 180 are reset by an output from fully activated G190. G236 within the end of both operands circuits 220 is fully activated and provides an output signal to reset the eighth FF 232. *tp*1 signals individually reset the ninth FF 222 and the tenth FF 224 within the end of both operands circuits 220.

With the various flip-flops providing "0" outputs, the system is in a condition for starting. Each of these previously mentioned flip-flops primes or disables associated circuitry, as will be later explained. *tp*2 to *tp*8 are not employed in this phase for effecting operations.

*Status level* $ROO_2$.—This status level is not employed in this addition and subtraction arrangement except to allow time for the various addressing operations.

*Status level* $ROO_3$.—At *tp*1 G5 is fully activated and provides an output which resets the C counter 16 (FIG. 4A) in the C addressing circuits 10. The C counter 16 is therefore cleared of its previous setting, and the same address placed in the C register 12 may be placed during the $ROO_3$ status level in the C counter 16. At *tp*8 in the $ROO_3$ status level G208 (FIG. 4C) in the status level control circuits 200 provides an output to initiate the RO status level.

*Status level RO*.—At *tp*1 in this status level G*s*38 (FIG. 4A) and G*s*58 are activated. G*s*38 couples the A counter 32 to the A memory 34, addressing the A memory 34 with the setting or binary combination previously placed in the A counter 32. Similarly, through G*s*58, the binary combination in the B counter 52 is used to address the B memory 54. In the end of both operands circuits 220 (FIG. 4C) *tp*1 is again used to reset the ninth FF 222 and the tenth FF 224. A like action occurs on each subsequent *tp*1, so that this resetting will not be further explained.

At *tp*2 in the RO status level no action occurs. At *tp*3, however, G36 (FIG. 4A) and G56 in the A and B memory circuits 30 and 50, respectively, are activated. The outputs from these gates 36, 56, applied to the A counter 32 and the B counter 52 respectively, provide an "add 1" input to each of those counters 32, 52. Thus the address in each of the counters 32, 52, which was the address of the least significant digit in each quantity stored in the memories 34, 54, is increased by one after the address is set from a counter 32 or 52 into the coupled memory 34 or 54. The A and B counters 32, 52 therefore at this point in time provide the binary address of the next to the least significant character in each of the binary quantities. On the occurrence of *tp*3 also, G66 (FIG. 4B) and G76 are fully activated. G66 which is primed by the "0" output of the first FF 118, provides an output to reset FFR D70. G76 having been previously primed by the "0" output of the fifth FF 154, provides an output to reset FFR E80. Note that G66 and G76 may not provide outputs if the termination circuits 100 and 130 operate to set the first FF 118 and the fifth FF 154.

*tp*4 is not employed in the RO status level sequence. *tp*5, however, fully activates G46 (FIG. 4A) which provides a read signal (gated *tp*5) to both the A memory 34 and the B memory 54. A gating signal, when applied to one of the memories 34, 54, activates the memory 34 or 54 to write in or read out information. During the RO status level a "read level" signal is applied, so the memory 34 or 54 staticizes the character stored as a binary combination at the addressed position. The stored character is staticized until a reset pulse is applied.

At *tp6*, G*s*68 and G*s*78 (FIG. 4B) are both impulsed. With the first FF 118 providing a "0" output, the character read out of the A memory 34 (FIG. 4A) is set into FFR D70 (FIG. 4B) through the coupling G*s*68. With the fifth FF 154 providing a "0" output and a not S signal provided by the system (that is, the process is to be an addition) the character read out of the B memory 54 (FIG. 4A) is set into the Z register 80 (FIG. 4B) through the coupling G*s*78. If an S signal is provided by the system (a subtraction is to be carried out), and the fifth FF 154 is providing a "0" output, G96 provides an output at *tp6*. The output of G96 activates G*s*94 to permit the passage of two bits of the output of the B memory 54 (FIG. 4A) through G94 (FIG. 4B) to the Z register 80.

*tp7* is applied to the reset input of each of the A and B memories 34, 54 (FIG. 4A). The A and B memories 34, 54 are read only during the RO status level because of the application of the read level signal during RO. The reading out of a character, started by the gated *tp5* signal, is terminated by the *tp7* reset signal.

G108, G110, and G112 (FIG. 4B) in the augend-minuend termination circuits 100 and G114 and G148 in the addend-subtrahend termination circuits 130 are each tested by the application of *tp8*. Any of these gates to which signals are applied from the coupled code recognizers in the termination circuits provide outputs on the occurrence of *tp8*. When activated, G108 sets the first FF 118, G110 sets the second FF 120, and G112 sets the third FF 122 in the augend-minuend termination circuits 100. In the addend-subtrahend termination circuits 130 G144 may set the fourth FF 152 and G148 may set the fifth FF 154.

*tp8* is also employed to reset the sixth FF 182 (FIG. 4C) in the carry circuits 180 during each status level. *tp8* is employed to terminate status level RO by activating G210 in the status level control circuits 200. G210 is fully activated on the application of *tp8* during RO and provides an output to the RI input in the status level generator (shown in FIG. 2). Thus the system proceeds to the RI status level. The RO status level may be considered to be used for placing a pair of characters in position for addition.

*RI status level.*—*tp1* is applied to the reset inputs of the A register 40 (FIG. 4A) and the B register 60 in the A and B memory circuits 30 and 50, respectively. The A register 40 and the B register 60 are therefore cleared of any previous settings and conditioned to receive new settings. *tp1* is also applied to G*s*22 and G*s*24, either of which is also activated by the "0" or "1" output at the $2^8$ bit from the C register 12. The particular gates, either G*s*22 or G*s*24 which are activated by the $2^8$ bit of the C register 12 are therefore fully primed on the occurrence of *tp1* and couple the C counter 16 to the A memory 34 or to the B memory 54. The address stored in the C counter 16 is thus used to address the A memory 34 or the B memory 54, depending upon which has been selected. The sum or difference address thus provided to the A memory 34 or the B memory 54 through the coupling G*s*22 or G*s*24 is held in the memory 34 or 54 until needed for storing the sum or difference.

The commencement of *tp1* in the RI status level starts the application of *cp1*, as described previously in conjunction with the operation control circuits of FIG. 2. *cp1* activates one input each of G*s*82 and G*s*84 (FIG. 4B). If the third FF 122 is providing a "0" output G*s*82 delivers four bits of the six bit output of the Y register 70 to the adder 160. These four bits constitute the numerical quantity of one character of the augend or minuend. At the same time, if the fourth FF 152 is providing a "0" output G*s*84 delivers four bits of the six bit output of the Z register 80 to the adder 160. These last four bits constitute the numerical quantity of the character of the addend or subtrahend. G86 is fully activated if the seventh FF 186 provides a "1" output during *cp1*.

During *cp1*, therefore, the augend or minuend, the addend or subtrahend, and the carry value are delivered to the adder 160. The added 160 is activated and provides its output during the occurrence of *cp2*. *cp2*, as stated previously, begins on the termination of *tp1*.

During *cp2* the output of the adder 160 is converted by the binary to coded decimal converter 170 and provided to both the A register 40 (FIG. 4A) and the B register 60. At *tp2*, during *cp2*, added signals are provided to the output of the binary to coded decimal converter 170 (FIG. 4B). It will be recalled that the output of the binary to coded decimal converter 170 represents four binary digits and a carry. The output of G230 (FIG. 4C) provides two added digital values corresponding to the $2^5$ and $2^4$ bit values. Because of the binary values previously illustrated for various numbers, $2^5$ may be assumed to be of binary "0" value, and the $2^4$ digit may be assumed to be of binary "1" value. A signal from G230 in the $2^4$ channel at *tp2* therefore recreates the full six bit character. The special symbols, which have other values in the two highest order digits, are provided in a manner to be separately described.

Note that within the end of both operands circuits 220 the output of the binary to coded decimal converter 170 (FIG. 4B) is applied to the ninth FF 222 (FIG. 4C) and the tenth FF 224. Only the $2^0$ digital value is applied to the ninth FF 222, and only the $2^3$ digital value is applied to the tenth FF 224. Binary "1" valued signals in the $2^0$ and $2^3$ channels set the corresponding flip-flops 222 and 224 for employment in subsequent character revision operations. The output of the binary to coded decimal converter 170 (FIG. 4B) and the two added bits from G230 (FIG. 4C) are used to set both the A register 40 (FIG. 4A) and the B register 60 with the character combination which is to be stored in the A memory 34 or the B memory 54.

At *tp3* in the RI status level, G18 is fully activated in the C addressing circuits 10, and an "add one" signal is applied to the C counter 16. The address previously read into the A or B memory 34 or 54 is therefore changed by one, so as to store the next subsequent address to be retained in the memory. At *tp3* also G234 (FIG. 4C) may provide an output in the end of both operands circuits 220. To provide an output at this time, G234 must also be activated by the "1" outputs of the second FF 120 (FIG. 4B) and of the fourth FF 152 or the fifth FF 154. As will be explained later, these signals from these three last mentioned flip-flops means that both operands have ended, so that the output of G234 (FIG. 4C) may be termed an "end of both operands" indicating signal. The end of both operands signal is applied to the set input of the eighth FF 232, to one input of zero recognizer gate 226, and to one input of nine recognizer gate 228.

In accordance with the numbering system employed, here, the only end of operand symbols and complemented end of operand symbols which have "1" values in the $2^0$ and $2^3$ bits are the minus symbol and the complemented item separator and space symbols. Each of these is the equivalent of decimal nine in the four lowest order digits. A "1" output from the ninth FF 222 and a "1" output from the tenth FF 224, together with an end of both operands signal from G234, therefore means that the output of the binary to coded decimal converter is 170 (FIG. 4B) the equivalent of decimal nine. On the application of *tp3*, therefore, nine recognizer gate 228 (FIG. 4C) if fully activated provides a signal to the reset input of the $2^4$ bit of both the A register 40 (FIG.

4A) and the B register. With the end of both operands detected a "1" is present in either the $2^0$ or $2^3$ bit from the binary to coded decimal converter unless the converter output represents a zero. If, therefore, the ninth FF 222 (FIG. 4C) provides a "0" output and the tenth FF 224 provides a "0" output, the output of the binary to coded decimal converter 170 (FIG. 4B) is a zero. Zeroes are recognized and signalled by the zero recognizer gate 226 (FIG. 4C) on the occurrence on the end of both operands signal from G234. Zero recognizer gate 226 outputs are applied as follows to the A register 40 (FIG. 4A) and the B register 60: (1) to set the $2^0$ bit of the A register 40, (2) to set the $2^0$ bit of the B register 60, (3) to reset the $2^4$ bit of the A register 40, and (4) to reset the $2^4$ bit of the B register 60. These signals have the effect of changing the space to a zero signal if a zero is recognized and of changing a nine to a minus sign if a nine is recognized following the end of both operands.

On *tp*4 the seventh FF 186 (FIG. 4C) is reset through G188.

On the occurrence of *tp*5 in the RI status level, G44 (FIG. 4A) and G64 may be activated. An input of each of these gates 44 and 64 is dependent upon the value of the $2^8$ bit in the C register 12. If the value of the $2^8$ bit is a "0," G44 provides an activating signal (gated *tp*5) to the A memory 34. Gated *tp*5 in this instance permits the storage of the information in the A memory 34. If the $2^8$ bit value stored in the C register 12 is a "1," G64 will be fully activated on *tp*5 and provide an output (gated *tp*5) to the B memory 54. Gated *tp*5 here will permit the desired character to be stored in the B memory 54. At *tp*5, also, G*s*42 or G*s*62 is fully activated, depending upon the $2^8$ bit in the C register 12. If the $2^8$ bit in the C register 12 is a "0," G*s*42 couples the A register 40 to the A memory during *tp*5 to read in the character held in the A register 40. If a "1" is the $2^8$ bit in the C register 12 the character stored in the B register 60 is read through G*s*62 into the B memory 54.

At *tp*6, G184 (FIG. 4C) in the carry circuits 180 will be fully activated if the sixth FF 182 has previously been set by a carry signal from the binary to coded decimal converter 170 (FIG. 4B). Outputs from G184 set the seventh FF 186. "1" outputs from the seventh FF 186 (FIG. 4C) are carry signals, stored for application at the proper time to the three input adder 160 (FIG. 4B) and the status level control circuits 200 (FIG. 4C). G*s*68 (FIG. 4B) and G*s*78 may again be fully activated at *tp*6. Neither gate 68 or 78 will provide outputs, however, because the A memory 34 (FIG. 4A) and the B memory 54 are not in the read state during status level RI.

*tp*7 is again used to reset the addressing portion of the memories 34, 54 following gated *tp*5.

At *tp*8 in the RI status level the sixth FF 182 (FIG. 4C) is reset, the carry signal having already been established. If a "0" output is provided from the eighth FF 232 in the end of both operands circuits 220 the end of both operands has not been detected and is not present. Therefore, G202 in the status level control circuits 200 is fully activated by *tp*8 and provides an RO signal to the operation control circuits (shown in FIG. 2).

If the end of both operands has been detected (a "1" output is provided from the eighth FF 232) and if there is no carry (a "0" output is provided from the seventh FF 186), an instruction complete signal is provided from G206 in the status level control circuits 200 at *tp*8. If the end of both operands has been detected but there is a carry (a "1" output from the seventh FF 186), and if the ninth FF 222 provides a "1" output or the tenth FF 224 provides a "0" output on the "not 8" line, an RD signal is provided at *tp*8 from G204.

*Status level RD*.—At *tp*1 in status level RD, G116 (FIG. 4B) in the augend-minuend termination circuits 100 is fully activated. G116 provides an output to reset the first FF 118, the second FF 120, and the third FF 122. At *tp*1 also, G146 in the addend-subtrahend termination circuits 130 is fully activated and provides an output to reset the fourth FF 152 and the fifth FF 154. The eighth FF 232 (FIG. 4C) is also reset in the end of both operands circuits 220 by the output of fully activated G236. G20 (FIG. 4A) in the C addressing circuits 10 applies a reset signal to the C counter 16.

The thus reset elements in the termination circuits 100 (FIG. 4B) and 130, end of both operands circuits 220 (FIG. 4C) and C addressing circuits 10 (FIG. 4A) prepare the system to effect an end-around-carry operation. This operation will be described in greater detail in conjunction with specific examples.

*tp*2 and *tp*3 are not employed in the RD status level. At *tp*4, G114 (FIG. 4B) and G150 are impulsed. Either G114 or G150 is primed by a "1" and "0" output from the $2^8$ bit place in the C register 12 (FIG. 4A). Whichever of the two gates G114 (FIG. 4B) and G150 is activated thus provides an output on *tp*4. The output of G114 sets the third FF 122 in the augend-minuend termination circuits 100. The output of G150 sets the fourth FF 152 in the addend-subtrahend termination circuits 130.

Following the unused *tp*5 in the RD status level, *tp*6 is applied to G*s*14 (FIG. 4A) in the C addressing circuits 10. G*s*14 is then activated to couple the C register 12 to the C counter 16 and to restore in the C counter 16 the original address placed in the C register 12. *tp*7 is not employed in the RD status level, but on the application of *tp*8 G208 (FIG. 4C) in the status level control circuits 200 is activated to provide an output to the RO input of the operation control circuits (shown in FIG. 2).

In providing the operations of addition and subtraction, various parts of these sequences of status levels may be repeated several times in achieving a result. Some parts may not be employed at all. In the cases most likely to be encountered, the system will shift between the RO and RI status levels until the end of both operands is reached. At that time the system may or may not perform an end-around-carry.

VII. Examples of Operation

Following are a series of examples intended to bring out the sequences employed for the various relationships which may exist between quantities to be added or subtracted.

(*A*) *Addition of positive operands*.—A basic operation of the system occurs when adding two positive quantities having an equal number of characters, as follows:

Augend=⊗372
Addend=⊗146

(where ⊗=an item separator or space symbol).

In the above example of quantities stored in an alphanumeric code the augend is placed in the A memory 34 (FIG. 4A) and the addend in the B memory 54. The computing system "remembers" the address at which these quantities are stored in the A and B memories 34, 54, and selects an address to which the sum of the two quantities is to be returned. Assume here that the sum is to be placed in the A memory 34. Accordingly, during the ROO cycles, the A counter 32 is provided with the address of the least significant character of the augend in the A memory 34, the B counter 52 is provided with the address of the least significant character of the addend in the B memory 54, the C register 12 and C counter 16 are provided with the address to which the least significant character in the sum is to be returned in the A memory 34, and a "0" output is provided at the $2^8$ bit position in the C register 12.

The least significant characters of the augend and addend ("2" and "6," respectively) are used to address the A and B memories 34, 54 at *tp*1 in the RO status level. These addresses are held until the memories 34, 54 are read by the succeeding gated *tp*5. At *tp*6 the least significant character of the augend is read from the A memory 34 into the Y register 70 (FIG. 4B) and the least significant character of the addend is read from the B memory 54 (FIG. 4A) into the Z register 80 (FIG. 4B). These flip-flop registers 70, 80 hold and staticize the least significant characters for the termination circuits 100, 130 and also for the adder 160. At *tp*8, G108, G110, and G112 in augend-minuend termination circuits 100 and G144 and G148 in the addend-subtrahend termination circuits 130 are tested to determine whether any of the special terminating symbols have been detected by the coupled code recognizers 102, 104, or 106; 132, 134, 136, 138, 140, or 142.

In the present example, no special symbols are present at the Y register 70 and the Z register 80 and accordingly the first characters of the augend and addend are read through G*s*82 and G*s*84, respectively, to the three input adder 160 during *cp*1 at the beginning of the RI status level.

Only four bits of each of the least significant characters are gated into the adder 160 at *cp*1. These quantities are added during *cp*2 and an output in binary form is provided to the binary to coded decimal converter 170. With the example chosen no carry signal is provided from the binary to coded decimal converter 170 (the sum of the least significant characters being 8), so that only a four bit output results.

As previously explained, the four least significant digits of each character determine the numerical value of the character, so that only these digits need pass through the adder 160. To restore the full character, however, the $2^4$ and $2^5$ bits must be returned, to augment the four bits of numerical value. Accordingly, a "0" value in the $2^5$ bit and a "1" value in the $2^4$ bit are derived through G230 (FIG. 4C) at *tp*2 in the RI status level. The six bit signal combination thus provided is used to set both the A register 40 (FIG. 4A) and the B register 60 with the least significant character of the sum of the augend and addend.

Although both the A register 40 and the B register 60 are set with the first sum character, only the A register 40 is coupled to a memory. The A register 40 is coupled through its associated G*s*42 opened at *tp*5 to the A memory 34. At *tp*5, the character (8) held by the A register 40 is stored in the A memory 34 at the point previously selected by the C counter 16. Previously, at *tp*1 in the RI status level, the C counter 16 had provided the desired address for the least significant character of the sum to the A memory 34 through G*s*22. This address is held by the A memory 34 as the character is written in at *tp*5. Subsequently, at *tp*7, the A memory 34 is reset preparatory to receiving new addresses. In addition, an "add one" pulse from G18 at *tp*3 sets the C counter 16 to the next character position.

With the least significant digits stored in the A memory 34 and the C counter 16 set to the next address position the arrangement shifts to the RO status level by providing an RO signal at *tp*8 through G202 (FIG. 4C) in the status level control circuits 200.

The addition of the characters having the next higher significance (the "7" from the augend and the "4" from the addend) is carried out during the RO and RI status levels. The steps are similar, except that the sum of the two characters is a decimal eleven, necessitating a carry. The carry is provided during *cp*2 in the RI status level from the binary to coded decimal converter 170 (FIG. 4B). The carry signal sets the sixth FF 182 (FIG. 4C), the "1" output of which primes G184 to provide an output on the occurrence of *tp*6, setting the seventh FF 186. The subsequent "1" output of the seventh FF 186 primes G86 until the next addition, during the next RO status level, is carried out. Note that the seventh FF 186 is reset at each *tp*4 during the RI status level to provide the proper output from the seventh FF 186 whether a carry does or does not occur.

The sum, without the decimal carry, of the second pair of characters is again stored after augmentation in the A memory 34 (FIG. 4A). This sum is placed in the next address position following the least significant character, after which the C counter 16 is again advanced by one.

With the carry pulse being retained in the carry circuits 180 (FIG. 4C), the arrangement proceeds to add the most significant characters (the "3" from the augend and the "1" from the addend) of the augend and addend in a similar fashion. The carry is provided to the three input adder 160 (FIG. 4B) from G86 during *cp*1. No carry occurs in this process because the sum is a decimal five. As with the previous two characters the output of the binary to coded decimal converter 170, together with the augmenting $2^4$ and $2^5$ bits, is stored in the A memory 34 (FIG. 4A).

The next character combinations to be added from augend and addend are both item separator or space symbols. Assume here that as shown above both are item separator symbols. Whether item separator or space, a space symbol is to be stored in the A memory 34 following the most significant digit of the sum. Again the characters from the augend and addend are placed in the Y register 70 (FIG. 4B) and the Z register 80, respectively. The item separator recognizers 104 and 134 in the augend-minuend termination circuits 100 (FIG. 4B) and in the addend-subtrahend termination circuits 130, however, now detect the occurrence of the item separator signals at the Y register 70 and the Z register 80. The item separator recognizer 104 on the augend side therefore primes G110 and G112 and the item separator recognizer 134 on the addend side primes G144. Each of the three primed gates, G110, G112, G144, provides an output on the occurrence of *tp*8. The second FF 120, the third FF 122, and the fourth FF 152 are therefore set and provide "1" outputs.

The outputs of the second FF 120, the third FF 122, and the fourth FF 152, provide conditioning and control signals to set up the system for the completion of this addition operation. The "1" output of the second FF 120 primes G234 (FIG. 4C) in the end of both operands circuits 220. The third FF 122, which no longer provides a "0" output, disables G*s*82 and blocks off that input to the three input adder 160 (FIG. 4B). The fourth FF 152 provides a "1" output to fully prime G234 (FIG. 4C) in the end of both operands circuits 220 and disable G*s*84 (FIG. 4B) from applying inputs to the three input adder 160. Thus, on the occurrence of subsequent clock pulses *cp*1 and *cp*2, characters which would be applied to the adder 160 are inhibited or blocked off. The three input adder 160 in effect adds inputs of 0000 and 0000. The output of the three input adder 160 is therefore 00000, and the four bit output of the binary to coded decimal converter 170 is 0000, with no carry.

The $2^5$ bit value of "0" and the $2^4$ bit value of "1" are again added at *tp*2 in the RI status level to make a six bit signal of 010000 applied to the A register 40 (FIG. 4A) and the B register 60. This six bit combination, however, as previously explained, represents a zero in the code employed. It is desired to change this provisional zero decimal value to the character combination of 000001, which combination represents the space value. Accordingly, the zero recognizer gate 226 (FIG. 4C) in the end of both operands circuits 220 is employed to change the provisional and temporarily stored character. The ninth FF 222 and the tenth FF 224 both provide "0" outputs to prime zero recognizer G45, in response to the "0" values of the $2^0$ and $2^3$ bits. The end of both operands signal output provided from G234 thus activates zero recognizer gate 226, providing a signal for converting a zero to a space. As is now understood, in the code employed only the presence of zeroes in the $2^0$ and the $2^3$ channel need be sensed to detect a zero if an end of both operands signal is present. The end of both operands circuits 220 may be said to monitor the result characters in detecting the need for a change, and in effecting the change.

The output of zero recognizer gate 226 effects the desired conversion of a zero to a space at the A register 40 (FIG. 4A). The "zero to space" signal sets the $2^0$ bit at the A register 40 and resets the $2^4$ bit at the A register 40. Accordingly, the previous provisional result combination of 010000, which was the equivalent of decimal zero, is now changed to 000001, which is the desired space symbol.

Thus the three characters of the sum have been determined and stored in the A memory 34, followed by the desired space symbol. The addition is therefore complete, so that the instruction complete signal may now be provided to the operation control circuits of FIG. 2. The instruction complete signal is provided from G206 (FIG. 4C) in the status level control circuits 200. G206 is primed by the "0" output of the seventh FF 186 in the carry circuits 180 (there being no carry at this point) and the "1" output of the eighth FF 232 in the end of both operands circuits 220 (this output representing the end of both operands). With these priming signals G206 provides an instruction complete output during the RI status level on the occurrence of *tp*8. The operation of the system on this pair of operands is therefore completed.

It will now be apparent that the operands and the result need not be of the same length. If one operand is shorter, but the sum is not longer than the longest operand, the operation is carried out by the same circuits. Assume the following quantities to be added:

```
⊜486283
   ⊜195
```

In order for the end of both operands circuits 220 to come into play the shorter operand should be filled in until both end of operand symbols coincide at the adder. The fill-in must be with a character or characters whose four least significant digits are the same as the desired arithmetic equivalent of the end of operand symbol.

The fill-in operation is started on the recognition of a special symbol and the setting of the third FF 122 (FIG. 4B) or the fourth FF 152. Once set, the third FF 122 and the fourth FF 152 disable G*s*82 and G*s*84, respectively, controlling the adder 160 input. G*s*82 and G*s*84 remain disabled through subsequent RO and RI sequences, blocking off the associated inputs of the three input adder 160. Thus, in effect, through the use of conditioning control signals the space value (0000) is provided to the disabled input of the adder 160 until the addition is complete.

The sum of two quantities may be longer than the longest of the two operands, as follows:

```
  ⊜456
 ⊜9826
 10282
```

In this situation the correct result is stored in the memory, but the most significant character in the result is not followed by a space. Assuming the above operands, the arrangement still retains a carry after having stored the "0" in the sum. The next inputs to the three input adder 160 are 0000 for the augend, 0000 for the addend, and "1" for the carry. An output of 0001 is thus provided from the binary to coded decimal converter 170. Subsequent to the addition, however, no carry is present although both end of operand symbols have occurred. Therefore G206 (FIG. 4C) in the status level control circuits 200 is fully primed by the "0" output of the seventh FF 186 and the "1" output of the eighth FF 232. G206 thus provides an instruction complete signal on the occurrence of *tp*8 in the RI status level.

(B) *Subtraction of one operand from another.*—Assume that the following quantities are to be operated upon in a subtraction process:

⊜426=minuend
⊜358=subtrahend=$\underline{9}$641 (nines complement)

(where as before the ⊜=an item separator symbol, and where $\underline{9}$=a complemented item separator symbol).

In this subtraction operation an S signal is provided from the computer (not shown). As previously, the quantities are entered into the A and B memories 34, 54 (FIG. 4A), the address of the least significant character of the minuend is placed in the A counter 32, the address of the least significant character of the subtrahend is placed in the B counter 52, and the desired address of the difference placed in the C register 12 and the C counter 16. Assume that the A counter 32 is again to be used to store the difference, so that the "0" output at the $2^8$ bit in the C register 12 is activated.

The $ROO_1$, $ROO_2$, $ROO_3$ status levels are completed and the RO status level is begun in the manner described in connection with the previous example. The least significant characters of the minuend and subtrahend are read, from the A and B memories 34, 54, respectively, at *tp*6. In subtraction, however, the nines complementer circuits 90 (FIG. 4B) are employed for each character from the B memory 54 (FIG. 4A). At *tp*6 in this situation G96 (FIG. 4B) is fully activated and provides an output to activate both the nines complementer 92 and G*s*94 in the nines complementer circuits 90. The output of the B memory is therefore directed through the nines complementer 92 and G*s*94 to the Z register 80.

Although a five bit input is provided to the nines complementer 92 the nines complementer 92 provides only a four bit output, the remaining two bits being derived from G*s*94. The $2^4$ bit is employed in the nines complementer 92 to distinguish certain characters which differ only in that bit. Note that although the four least significant bits of a character are complemented, the two most significant bits are not. In their four least significant bits, complemented item separator and space symbols are provided as the equivalent of decimal nine from the nines complementer 92 circuit. The minus symbol is also equivalent in its four least significant bits, to decimal nine, so that the same designation, 9, is here used for all three special symbols.

The characters stored by the Z register 80 are staticized and provided to the various code recognizers 132 to 142 in the addend-subtrahend termination circuits 130. In the same manner as previously described, the successive pairs of characters from the minuend and subtrahend are provided to the three input adder 160 and returned to the desired difference address in the A memory 34 (FIG. 4A) from the binary to coded decimal converter 170 (FIG. 4B). Subsequent to the addition of the most significant characters, an end-around-carry must be carried out. Specifically, in the given subtraction

```
 ⊜ 426
 9 641
  1067
```

The "1" in the difference represents the "1" which is to be employed in the end-around-carry to give the final difference of 068.

The carry is retained in the carry circuits 180 (FIG. 4C) as the end of operand symbols (⊜ and $\underline{9}$) are passed through the system. The item separator in the minuend is recognized by the item separator recognizer 104 (FIG. 4B) in the augend-minuend termination circuits 100 as the symbol is staticized by the Y register 70. The complemented item separator symbol is recognized by the complemented item separator recognizer 140 (FIG. 4B) in the addend-subtrahend termination circuits 130 as the complemented symbol is staticized by the Z register 80.

The effect of recognizing an item separator in the augend-minuend termination circuits 100 is to set the second FF 120 through G110 and to set the third FF 122 through G112. The second FF 110 primes G234 (FIG. 4C) in the end of both operands circuits 220. The third FF 122 (FIG. 4B) disables G*s*82, shutting off the minuend input of the three input adder 160.

The output of the complemented item separator recognizer 140 (FIG. 4B) in the addend-subtrahend termination circuits 130 sets the fifth FF 154 through G148. The "1" output of the fifth FF 154 primes G234 (FIG. 4C) in the end of both operands circuits 220 but does not disable G*s*84 (FIG. 4B) at the remaining input of the three input adder 160. The character (9) staticized in the Y register 80 is therefore provided as subtrahend input to the three input adder 160 on the subsequent *cp*1. The subtrahend input and the carry give a result of decimal ten from the three input adder 160. A decimal ten, when applied to the input of the binary to coded decimal converter 170, causes a converter 170 output of 0000 and a carry. The carry signal again is used to set the seventh FF 186 (FIG. 4C) in the carry circuits 180. The 0000 output is applied, along with an augmenting $2^5$ bit value of "0" a $2^4$ bit value of "1," to FFR A40 (FIG. 4A) at *tp*2 in the RI status level. At *tp*3 the end of both operands signal is provided from G234 (FIG. 4C). As explained above, in the first example, the end of both operands circuits 220 monitor the result characters. In this situation, the zero recognizer gate 226 is activated, and provides an output which changes the provisional stored character in FFR A40 (FIG. 4A) from a zero to a space.

It will be understood that the same symbols are applied and that the same action occurs in the B memory 54 if the B memory 54 is to be employed in storing the difference. The space symbol is now placed in the A memory 34 following the most significant character in the difference. The action is accomplished during the remainder of the RI status level with the address provided by the C counter 16 as previously described.

The steps employed in end-around-carry, however, must still be completed. Therefore the arrangement enters the RD status level by providing an output from G204 (FIG. 4C) to the operation control circuits of FIG. 2 at the end of the RI status level. G204 is fully primed to provide an output on *tp*8 by the "1" output of the seventh FF 186 in the carry circuits 180, by the "1" output of the eighth FF 232, and by the "1" output of the ninth FF 222 in the end of both operands circuits 220.

At *tp*1 in the RD status level the C counter 16 (FIG. 4A) in the C addressing circuits 10 is reset. At *tp*1 also, the fourth FF 152 (FIG. 4B) and the fifth FF 154 in the addend-subtrahend termination circuits 130 are reset through G146 and the first FF 118, the second FF 120, and the third FF 122 in the augend-minuend termination circuits 100 are reset through G116. Also the eighth FF 232 (FIG. 4C) in the end of both operands circuits 220 is reset through G236.

At *tp*4, G150 (FIG. 4B), which is primed by the "0" output of the $2^8$ bit in the C register 12 (FIG. 4A), provides an output to set the fourth FF 152 (FIG. 4B) in the addend-subtrahend termination circuits 130. The subsequent "1" output of the fourth FF 152 primes G234 (FIG. 4C) in the end of both operands circuits 220 and disables G*s*84 (FIG. 4B) at one input to the three input adder 160. Because only the difference stored in the A memory 34 (FIG. 4A) is to be added to the carry, the quantity stored in the B memory 54 is not involved and is thus blocked off at G*s*84 (FIG. 4B).

At *tp*6 in the RD status level the count stored in the C register 12 (FIG. 4A) is provided to the A counter 32. The A counter 32 is set to the address of the least significant character of the difference in the A memory 34, as is the C counter 16. The system is now prepared to begin an addition of the stored carry signal with the temporary difference (067) stored in the A memory 34. At *tp*8 in the RD status level, therefore, G208 (FIG. 4C) provides an output to the RO input of the operation control circuits (shown in FIG. 2), thus again beginning the RO status level.

Accordingly, the stored carry (1) is now added to the least significant character (7) of the difference. The corrected character (8) is returned to the same address point (provided by the C counter 16 (FIG. 4A) in the A memory 34. The cycle of operation repeated during later RO and RI sequences for the individual difference characters of increasing significance. As long as carries occur they are added to the characters of the difference, although the characters of the difference are run through whether there is a carry or not.

When the space symbol stored following the most significant character in the difference is detected in the augend-minuend termination circuits 100 (FIG. 4B) the second FF 120 and the third FF 122 are set. The four bit input to the three input adder 160 which is controlled by G*s*82 is thus shut off. The remaining four bit input, controlled by G*s*84, was previously shut off on the start of the end-around-carry operation. Consequently, a 0000 output without carry is provided from the converter 170 and the operation is completed as described in the first example. That is, a zero (010000 in the code used here) is first stored in the A register 40 (FIG. 4A) and then converted to a space (000001). Finally, the instruction complete signal is provided from the status level control circuits 200 (FIG. 4D).

Storage of a difference in the B memory 54 (FIG. 4A) is accomplished in the same fashion. Because the end-around-carry is an addition operation, however, the nines complementer circuits 90, FIG. 4C) are not to operate following the RD status level. Accordingly, the RD signal is employed in the remainder of the computing system to terminate the "S" signal and to provide the "A" signal for the remainder of the operation.

The subtraction of a negative number is carried out by a process similar to that of the first example when the length relationships of the operands and the sum are the same (when the difference has the same number of characters as the longest operand). In this situation, each character of a quantity stored as a negative number in a memory 34 or 54 (FIG. 4A) is complemented in the usual fashion before presentation to the three input adder 160 (FIG. 4B). The complement of the minus symbol is treated as a space or item separator symbol is treated during the addition of a positive number.

The complement of a minus symbol provided from the nines complementer 92 is a zero in the four least significant digits. The complemented minus sign in the subtrahend is recognized by the complemented minus sign recognizer 136 in the addend-subtrahend termination circuits 130 when the complemented minus symbol is staticized by the Y register 80. The output of the complemented minus sign recognizer 136 sets the fourth FF 152 through G144 at *tp*8 in the RO status level. The "1" output from the fourth FF 152 disables G*s*84, blocking off the corresponding input of the three input adder 160, and providing a 0000 input for the subtrahend character at the end of the operand. Thus the steps are the same as those of the first example and a complemented minus is treated as a space or item separator symbol. Note that in the addend-subtrahend termination circuits 130 the outputs of the code recognizers 132, 134, 136 for space, item separator, and complemented minus symbols are all directed to the same gate, G144.

When subtracting a positive operand of short length from a longer positive operand, the shorter positive subtrahend must be filled with the complemented space symbol (9) to the same number of characters as the longer operand. Thus the following steps are to be carried out:

⊕1426 = ⊕1426
⊕98 = $\underline{99}$901 (complemented)
101327 = ⊕1327 + an end-around-carry
= ⊕1328

Here the desired steps are carried out through the employment of G148 and the fifth FF 154 in the addend-subtrahend termination circuits 130, and G*s*78, G76, and G96 on the addend side. On the detection of the occurrence of a minus sign, a complemented space, or a complemented item separator symbol in the subtrahend an output is provided from the activated code recognizer 138, 140, or 142 to prime G148. At *tp*8 in the RO status level G148 provides an output which sets the fifth FF 154. The subsequent "1" output of the fifth FF 154 disables G*s*78, G76, and G96 on the addend side. The disabled G*s*78 blocks off uncomplemented inputs to the Z register 80 from the B memory 54 (FIG. 4A). The disabled G96 (FIG. 4B) controls the coupled nines complementer 92 and G*s*94, preventing those units from passing information. G76 does not provide reset signals to the Z register 80. Therefore the Z register 80 is effectively blocked off from further set or reset signals and the same character ($\underline{9}$) is held in the Z register 80 for subsequent RO and RI sequences. G*s*84, which controls one input to the three input adder 160, remains open, however, because the fourth FF 152 is providing a "0" output during this time. The 1001 output staticized by the Z register 80 for the $\underline{9}$ end of operand symbol is therefor applied as input to the three input adder 160 during each subsequent adding step. Accordingly, the fill-in of the $\underline{9}$ symbol is accomplished as desired.

The termination of the above operation on the given operands is carried out in the manner previously described. The $\underline{9}$ and the carry are added together, giving a carry and a 0000 output from the binary to coded decimal converter 170. The 0000 output is converted to a space symbol and stored in the memory 34 or 54 (FIG. 4A). The carry is used in an end-around-carry, giving the final correct result of ⊕1328.

(*C*) *Further situations in addition and subtraction.*—On the termination of both operands the output from the converter 170 (FIG. 4B) may be an eight with a carry or a nine with or without a carry. These situations result in different sequences to give the final correct results in each case.

A nine with a carry results when adding two negative operands or subtracting a positive subtrahend from a negative minuend and when also the sum or difference is as long as the longest operand. To illustrate, assume the following problem:

− 836 = $\underline{99}$163
−8178 = 91821
1$\underline{9}$0984

The "1" in the above result represents the end-around-carry correction. When the end-around-carry is completed, the following correct result is provided:

$\underline{9}$0985 = −9014

The 0984 portion of the result is produced on adding the four least significant characters of the two operands in the fashion previously described. When the ends of both operands have not been reached, a $\underline{9}$ is treated as a number in the addition and in the result. On reaching the end of both operands, a $\underline{9}$ is still treated as a number but may have other effects. In the above example, the two most significant caracters both $\underline{9}$s, are added together with the carry resulting from the addition of the immediately previous characters. The output from the adder 160 is therefore a binary quantity of the decimal value of 19. The output from the binary to coded decimal converter 170 is a carry plus a $\underline{9}$ (1001). The 1001 output of the converter 170 sets both the ninth FF 222 (FIG. 4C) and the tenth FF 224 in the end of both operands circuits 220. The resultant "1" outputs of the ninth FF 222 and the tenth FF 224 prime the nine recognizer gate 228. With the end of both operands having occurred, G234 provides an end of both operands signal which activates the nine recognizer gate 228. The signal from nine recognizer gate 228 is employed to change the signal stored in the A register 40 (FIG. 4A) or the B register 60 from the nine to a minus in the selected code.

Note that with both end of operand signals present the only special terminating symbol which may have "1" values in both the $2^0$ and $2^3$ bits is a nine. Thus, the two recognizer gates 226, 228 (FIG. 4C) properly determine the existence of nines, as well as the existence of zeroes, on the end of both operands.

A $2^5$ bit value of "0" and a $2^4$ bit value of "1" are added from G230 to the binary to coded decimal converter 170 (FIG. 4B) output of 1001. The nine recognizer gate 228 (FIG. 4C) output, applied to the reset input at the $2^4$ bit of the A register 40 (FIG. 4A) or the B register 60, replaces the $2^4$ bit value of "1" with a "0." The stored symbol, which is placed in the memory 34 or 54, is thus 001001, which is the desired minus symbol.

The end-around-carry must still be performed to complete the operation. Thus, G204 (FIG. 4C) in the status level control circuits 200 provides an output to the operation control circuits of FIG. 2 to enter the RD status level. G204 is at this time fully primed by the carry signal from the seventh FF 186, the end of both operands signal from the eighth FF 232, and the "0" output from the tenth FF 224. The RD status level is entered and the end-around-carry is completed as previously described in the second major example.

A different situation is encountered when the result is a $\underline{9}$ at the termination of both operands. In this situation the $\underline{9}$ is employed as the end of operand symbol and the instruction complete signal is provided.

An illustrative situation is provided:

−8726 = $\underline{9}$1212 (Complemented)
26 = ⊕26
−8760 = $\underline{9}$1239

With the above operands, the addend is filled in with spaces until the end of operands are reached. When the terminating symbols of both operands are provided the three input adder 160 (FIG. 4B) adds a space (0000), and a $\underline{9}$ (1001). The output of the adder 160 and the binary to coded decimal converter 170 is 1001, there being no carry. The augmenting $2^5$ and $2^4$ bits give a temporary character in the A register 40 (FIG. 4A) or the B register 60 of 011001. The nine (1001), however, is again recognized and the stored character is changed from the temporary character to a minus symbol, or 001001. The instruction complete signal is now provided because G206 (FIG. 4C) is fully primed by the seventh FF 186 (there being no carry) and the eighth FF 232 (both operands having ended).

Somewhat different sequences are employed where, on adding the values of both end of operands symbols, the result is an eight (1000) and a carry. Operands which create this condition may be as follows:

− 836 = $\underline{99}$163
− 9878 = $\underline{9}$0121
−10714 189284

To provide the proper result with such operands an added 9 should be placed in each operand and an end-around-carry completed, as follows:

999163
990121
1989284=989285 (complemented and end-around-carry)
=−10714

Addition (or subtraction) of the operands is carried out in the fashion previously described until the eight plus a carry is provided from the converter 170 (FIG. 4B). This converter 170 output occurs in the first addition in which both operands provide end of operand symbols.

On the coincidence of two end of operand symbols, the presence of an eight (1000) in the output of the binary to coded decimal converter 170 is detected by the ninth FF 222 (FIG. 4C) and the tenth FF 224 in the end of both operands circuits 220. As may be seen by inspection, if the value of the $2^0$ bit is "1" or if the value of the $2^3$ bit is "0" an eight is not present in the converter 170 (FIG. 4B) output. The "1" output of the ninth FF 222 (FIG. 4C) represents a "1" value in the $2^0$ bit and the "0" output of the tenth FF 224 represents a "0" value in the $2^3$ bit. Accordingly, a conductor responsive to both the "1" output of the ninth FF 222 and the "0" output of the tenth FF 224 is here designated as carrying "not eight" signals. On the occurrence of an eight in the present situation the "not eight" signal is not provided.

The absence of a "not eight" signal here maintains the arrangement in the same (RI) status level, because a "not eight" signal is needed to activate G204 in order to enter the RD sequence. A carry signal from the seventh FF 186 is provided at this point in time. On the presence of a carry signal G206 lacks a "0" priming output from the seventh FF 186 and does not provide an instruction complete signal. Therefore the arrangement stays in the same status level, repeating the RI sequence from *tp*1 to *tp*8.

On repeating the RI sequence, a new 9 is added in for each operand, together with the carry from the previous addition. The 9's are held in the Y register 70 (FIG. 4B) and the Z register 80 following the previous addition and are thus staticized to enter the adder 160 along with the carry. The adder 160 provides a binary 19 output, so that the converter 170 provides a 1001 output plus a carry. Now, the "not eight" signal is provided to G204 (FIG. 4C) along with the carry signal from the seventh FF 186 and the end of both operands signal from the eighth FF 232. G204 is therefore fully activated on the occurrence of the subsequent *tp*8 and provides an RD signal to the operation control circuits of FIG. 2. The RD signal commences the steps of end-around-carry, during which the 1001 output of the converter 170 (FIG. 4B) is changed to represent a minus symbol. The manner in which the end-around-carry is completed and an instruction complete signal is provided has been described in conjunction with the second major example above.

*VIII. Conclusion*

Thus there has been described an arrangement for adding or subtracting quantities of variable, non-standard lengths. Subtraction may be provided when desired, by complementation of one of the operands. End of operand symbols are recognized and used in the arithmetic process. The manner in which the end of operand symbols are treated may be said to be algebraic, in that the relationship and properties of the quantities involved are determined by the symbols occurring in the quantities. The end of operand symbols are used to control inputs applied to an adder. When operands are of unequal lengths the proper numerical values are filled in for the shorter operand, even though the characters involved may be complemented. Result characters are provided in the same form as the characters of the original operands. Numerical values and the ends of both operands are employed to control the numerical value of the most significant character in the result, and of the sign of the result. An end-around-carry situation may be recognized and effected, to alter the results of previous sequences. Character segments which are not involved in arithmetic steps may be handled separately. Result characters may be revised in a temporary storage when circumstances require. The highly integrated nature of the system permits the handling of many different contingencies with relatively few units. A specific coding scheme has been described to illustrate various operations. Other coding schemes, however, may be employed within the basic framework provided.

What is claimed is:

1. In a system for adding two operands or subtracting one operand from another, said operands each comprising serially presented characters each consisting of signals representing a plurality of bits and said operands respectively having special terminating characters different from the others, the arrangement comprising means for successively staticizing the respective characters of said operands, means responsive to said staticizing means for recognizing said special characters, an adder, and adder input control means coupled to said staticizing means and said adder and responsive to said recognizing means for applying certain preselected ones of said characters to said adder on the recognition of said special characters by said recognizing means.

2. In a system for adding two operands or subtracting one operand from another, said operands comprising trains of characters each consisting of signals and each said train having a special terminating character, the arrangement comprising resettable means for staticizing the characters of said operands, means responsive to said staticizing means for recognizing said special characters, an adder, first gating control means responsive to said recognizing means for selectively coupling said staticizing means to said adder, and second gating control means responsive to said recognizing means for selectively resetting said staticizing means.

3. In a system for adding two operands or subtracting one operand from another, said operands comprising trains of characters each consisting of signals and including special sign and termination significant characters at the ends of said trains, the arrangement comprising resettable means for staticizing the characters of said operands, means responsive to said staticizing means for recognizing said special characters, an adder, bistable means responsive to said recognizing means for providing conditioning control signals, first gating means responsive to said conditioning control signals for selectively coupling said staticizing means to said adder, and second gating means responsive to said conditioning control signals for selectively resetting said staticizing means.

4. In a system providing result characters from arithmetic operation on operands each comprising coded sequentially presented characters, said coded characters each consisting of signals and each having a numerical portion, said characters including special characters, an arrangement for providing selected result characters under predetermined conditions comprising means for performing said operation sequentially on said characters for providing arithmetic result characters serially, means for temporarily storing each of said arithmetic result characters in sequence, means responsive to said storing means for recognizing said special characters, and means responsive to said recognizing means and to said result providing means for responding to the numerical portions of said arithmetic result characters for altering characters in said storing means, whereby said selected result characters are provided in said storing means on the existence of predetermined relationships.

5. In a system providing numerical results from arithnetic operation on operands comprising serially presented signals representing coded characters, said coded characters having a numerical portion and a non-numerical portion and including special characters each of said characters consisting of signals, an arrangement comprising means for providing numerical portions of result characters in response to signals representing said operand numerical portions, means responsive to said providing means for temporarily storing said numerical result portions, means for augmenting each of said numerical result portions in said temporary storing means with non-numerical portions to provide provisional result characters, means for recognizing said special operand characters, and means responsive to said recognizing means and said numerical portion result providing means for selectively altering certain of said provisional result characters, whereby certain desired result characters are provided on the existence of selected relations among operand and result characters.

6. In a system providing numerical results from arithmetic operation on operands of coded characters, said coded characters each consisting of signals and including special characters and each of said characters including a portion having numerical significance and a portion having other than numerical significance, an arrangement for providing special characters as result characters after an arithmetical operation on said operands comprising means for computing and temporarily storing numerical result portions computed from said operand numerical portions, means for augmenting said numerical result portions in said temporary storing means with character portions having other than numerical significance to provide provisional result characters, means for recognizing operand characters which are said special characters, and means responsive to particular values in said numerical results and to said recognizing means for applying signals to said temporary storing means to alter said provisional result characters whereby said special result characters are then provided in said temporary storing means.

7. A system for adding a pair of variable, non-standard maximum length quantities or subtracting said quantities one from the other, each quantity being represented by a train of binary-coded decimal characters presented sequentially, least significant character first, and each character consisting of signals representing a like number of bits, said characters including at least one special character having sign or termination meaning in a highest order position in said quantity, said system comprising means to provide individual characters by pairs, least significant character of each said train first, from said quantities, means to selectively nines complement the characters of a given one of said quantities, adder means responsive to said pairs of characters to provide binary-coded decimal result characters with carry, means to store said binary-coded decimal result characters, carry storage means coupled to said adder means, means for recognizing said special characters, among said operand characters means responsive to said adder means, said carry storage means, and said recognizing means and coupled to said result character storing means for adding a carry to the result under carry conditions, and means responsive to said adder means for revising preselected individual signals representing certain bits of said result characters under predetermined conditions.

8. A system for adding a pair of operands, or subtracting one operand from another, each operand comprising a train of sequentially presented characters and including special sign and terminating characters, each of said characters consisting of signals representing a like plurality of bits, the characters of negative operands being in nines complement form, said system comprising means responsive to control signals to staticize in pairs characters of like significance from said operands, means responsive to control signals to selectively complement a given one of said operands, means responsive to control signals and said staticizing means to recognize the occurrence of said special characters, adder means responsive to control signals, said complementing means, said staticizing means, and said recognizing means to provide result characters with carry from the addition of said pairs of characters, means responsive to control signals and to said adder means to provide carry signals for said adder means, means responsive to said adder means to store said result characters, means responsive to said adder means and to control signals to revise selected individual signals representing selected bits of said result characters under carry conditions, means responsive to control signals, said adder means, said carry signal providing means, and said recognizing means to add a carry to the result as an end-around-carry, and a plurality of gates responsive to said recognizing means, said revising means, and said carry signal providing means for providing control signals to effect operation, alternatively, of said above-identified means in predetermined sequences to add said operands and to add a carry to the result.

9. In a system which operates on serially presented binary-coded decimal operand characters each consisting of signals representing a like plurality of bits and each in complemented or non-complemented form to provide binary-coded decimal result characters and carry signals, said system including adder means responsive to said characters, said operand characters including special sign and terminating characters, and said system also deriving a result operand made up of said result characters, an arrangement for controlling the content of said result operand comprising means responsive to said special characters to block off the application of predetermined characters to said adder means, means responsive to said special characters to provide predetermined numerical characters to said adder means, means for temporarily storing each of said result characters, means responsive to said result characters and to said special characters for altering signals representing selected bits of said result characters in said temporary storage, and means responsive to said special characters, said carry signals, and said result characters for signalling that a carry is to be added to said result operand.

10. The invention as set forth in claim 9, wherein said means responsive to said special characters to block off application of predetermined characters to said adder means includes recognition gates for recognizing the occurrence of said special characters, multivibrators responsive to said recognition gates for providing conditioning potentials under predetermined relationships of special characters, and coincidence gates conditioned by said multivibrator means to provide said characters to said adder means, and wherein said means for signalling that a carry is to be added to said result includes coincidence gate means responsive to said special characters, said carry signals, and said result characters.

11. In a system which adds operands of serially presented binary-coded decimal operand characters each consisting of signals representing a like plurality of bits, said characters being in complemented or non-complemented form to provide binary-coded decimal result characters and carry signals, said system including adder means responsive to said operand characters said adder providing result characters having signals of a lesser number of bits said operand characters including special sign and terminating characters, and said system also deriving a result operand made up of said result characters, an arrangement for controlling the content of said result operand comprising means to staticize said operand characters, means to recognize said special characters, means responsive to said recognizing means to selectively couple said staticizing means to said adder means, means responsive to said adder means for temporarily storing the outputs of said adder means, means for applying signals to said temporary storing means to provide provisional result characters representing said like plurality of bits, means responsive to said adder means and said recognizing means selectively to alter signals representing preselected bits of said provisional result characters to provide special sign and terminating characters in said result, and means responsive to said special characters, said carry signals, and said adder means for signalling that a carry is to be added to said result operand.

12. In an adder-subtracter operating upon binary-coded decimal characters each consisting of signals representing respectively six bits, in each of which characters the four least significant bit signals represent the binary equivalent of a decimal number and the two most significant bit signals signify the nature of the character, the adder-subtracter adding successive characters, complemented or non-complemented, to provide binary-coded decimal result characters including carry, an arrangement for signalling end-around-carry situations comprising means responsive to all bit signals of each character for recognizing the termination of complemented and non-complemented operands, means responsive to the four least significant bit signals of each result character for recognizing zeros, nines, and not eights, and coincidence means responsive to said termination recognizing means, said carry signals, and said zero, nine, and not eight recognizing means for indicating the occurrence of an end-around-carry situation.

13. A system for adding two operands or subtracting one operand from another, said operands comprising successively presented characters and being of variable, non-standard maximum length and having special sign and terminating characters, each of said characters consisting of signals representing a like plurality of bits, said system comprising data storage means to hold said operands and the result of an operation thereon, means coupled to said data storage means for successively providing arithmetic result characters from said operand characters as successively presented, means each receiving all characters of an operand to recognize said special characters in said operands, means responsive to said result providing means to apply said result characters to said data storage means, and means coupled to said data storage means and responsive to said recognizing means and said result providing means for performing an end-around-carry with said result characters.

14. A system for adding two operands, each consisting of sequentially presented characters each consisting of signals representing a like plurality of bits, in complemented or non-complemented form, said operands having special sign and terminating characters, said system comprising means to store said operands and a result operand, means responsive to said storing means to staticize said operand characters in sequence, means selectively to complement the characters of one of said operands, means responsive to said staticizing means for recognizing said special characters, means responsive to said recognizing means and coupled to said complementing means and said adder means to provide inputs to said adder means, and means responsive to said storing means, said recognizing means, and said adder means for adding an end-around-carry to said result operand.

15. A system for adding two operands or subtracting one operand from another, each operand comprising a train of characters, each character consisting of signals representing a like plurality of bits said system comprising means for storing said operands and the result of an addition or subtraction thereon, means responsive to said storing means for staticizing successive characters by pairs from said operands, special characters signaling respectively the ends of the operands, means responsive to said staticizing means for recognizing the said special characters thereby to recognize the ends of said operands, means responsive to said staticizing means for providing result characters from said pairs of characters, means responsive to said adding means for applying said result characters to said storing means, and means responsive to said adding means and said recognizing means and coupled to said storing means and said staticizing means for adding a carry to the result characters in said storing means.

16. A system for adding two operands or subtracting one operand from another, each operand comprising a train of characters each consisting of signals representing a like plurality of bits and having special terminating characters, the characters of negative operands being nines complemented, said system comprising means for providing a first operand character by character, means for providing a second operand character by character, means for selectively complementing a given one of said operands when the operation to be performed is subtraction, means for detecting the termination of each of said operands as the terminating character of each of said operands is presented, means for adding said characters from said first and second operands by pairs as presented, means responsive to said adding means for successively storing result characters as derived from said addition, and sequence control means coupled to said storing means and responsive to said termination detecting means and the numerical values of the results of addition for providing an end-around-carry sequence.

17. A system for adding or subtracting operands of variable, non-standard maximum lengths, each quantity comprising a train of characters each consisting of signals representing a like plurality of bits, certain bits of each character denoting a numerical value, a character of terminating significance being adjacent the most significant numerical character of said train of characters, the numerical values of the characters of negative quantities being the nines complements of characters of positive quantities, said system comprising a first memory means for a first of said operands, means coupled to said first memory means for providing said first operand least significant character first, second memory means for a second operand, means coupled to said second memory means for providing said second operand least significant character first, means for successively complementing the characters of a given one of said operands when a subtraction operation is to be performed, means responsive to both said operand providing means for recognizing the occurrence of terminating characters among said operand characters as presented, means responsive to both said operand providing means and said recognizing means for sequentially adding said pairs of characters, means responsive to said adding means for storing the results of said additions in one of said memory means, and sequence control means coupled to said first and second memory means and said first and second means for providing operands, and responsive to said terminating character recognizing means and the denoted numerical values of the result characters of said addition for providing an end-around-carry sequence.

18. In a system employing operands in a binary-coded decimal form, each of said operands comprising characters, each of said characters consisting of signals representing a like plurality of bits and having a numerical portion of said bits in a binary code and added distinguishing bits, the operands being arranged from least to most significant characters and each having a special terminating character adjacent and succeeding the most significant character, an arrangement for adding or subtracting comprising means to provide the characters of each operand in sequence, least significant character first, from each operand, including means to nines complement characters from one of the operands when a subtraction is to be performed, means to staticize successively the characters thus provided, means responsive to the staticizing means to recognize the special terminating characters, means responsive to the staticizing means to provide in binary-coded decimal form, a sum character from each pair of characters in said staticizing means, means to hold said sum characters, and means responsive to the recognizing means and sum characters and coupled to the sum character holding means to add a carry to the sum under predetermined conditions.

19. A system for adding or subtracting binary-coded decimal operands of variable, non-standard maximum length, the characters of said operands each consisting of signals representing a like plurality of bits and each having a numerical portion of bits in binary code and added distinguishing bits, said characters being arranged from least to most significant within said operands and said operands including at least one special terminating character adjacent and succeeding the most significant numerical character, said system comprising means successively to provide a character from each operand, the characters from said operands being paired together least significant character first, said character providing means including means to nines complement the numerical value of the characters from a given one of the operands when a subtraction is to be performed, means to staticize each pair of characters as provided from the operands, means responsive to said staticizing means to recognize the special terminating characters in said operands, means responsive to said staticizing means and said recognizing means to provide binary-coded decimal result characters, with carry, from each pair of characters, means to store said result characters in sequence, means to store and add in carry signals when necessary from each pair of characters, means coupled to said means to store result characters and responsive to said recognizing means, said result characters, and said carry signals to selectively add an end-around-carry to said sequence of result characters.

20. In a system providing for arithmetic operation on a pair of operands each comprising a train of binary-coded decimal characters, each of said characters consisting of signals representing a like plurality of bits, said system including means to store and utilize the result of an operation on said operands, an arrangement for adding said pair of operands or subtracting one from the other comprising means to provide and staticize successive pairs of characters, one of said pair from each operand, means to provide a binary-coded decimal arithmetic result including carry, if any, from each of said pairs of characters, means responsive to said arithmetic means to store said carry signals, means responsive to said character providing and staticizing means to recognize the termination respectively of each of said operands, and means responsive to said termination recognition means and to said arithmetic means to selectively add said carry to the said result as an end-around-carry.

21. In a system providing for arithmetic operation a pair of variable, non-standard maximum length operands each comprising a train of binary-coded decimal characters and including special sign and terminating characters, each of said characters consisting of signals representing a like plurality of bits, said system including means to store and utilize the result of an operation on both said operands, individual characters of negative operands being coded in nines complements, an arrangement for adding said pair of operands or subtracting one from the other comprising means to provide and staticize successive pairs of characters, one of said characters from each operand, said providing means including means to nines complement each character of one of said operands, adder means responsive to said pairs of characters to provide a binary-coded decimal result character including carry from each of said pairs of characters, carry storage means responsive to said adder means, means responsive to said character providing and staticizing means to recognize said special characters in each of said operands, and means responsive to said recognizing means, said carry storage means, and said adder means, to selectively perform an end-around-carry with the result provided from said operands.

22. In a system providing for arithmetic operation a pair of variable, non-standard length operands each comprising a train of binary-coded decimal characters and including special sign and terminating characters, each of said characters including signals representing a like plurality of bits of which a portion are of numerical significance and another portion are of special significance, said system including means to store and utilize each result character of an operation on both said operands, individual characters of negative operands being coded in nines complements, an arrangement for adding said pair of operands or subtracting one from the other comprising means to staticize successive pairs of characters and means to derive said result characters successively from said staticizing means for storage by said storing means one of said characters from each operand, means to nines complement at least one of said operands, adder means responsive to said staticizing means to provide a binary-coded decimal result character including carry from each pair of characters, carry storage means responsive to said adder means, means responsive to said staticizing means to recognize said special characters in each of said operands, means responsive to said adder means and said recognizing means selectively to alter the numerically and specially significant portions of result characters, and means responsive to said recognizing means, said carry storage means, and said adder means, selectively to perform an end-around-carry with the said stored result characters.

References Cited in the file of this patent

UNITED STATES PATENTS

| | | |
|---|---|---|
| 2,538,636 | Williams | Jan. 16, 1951 |
| 2,604,262 | Phelps | July 22, 1952 |
| 2,611,813 | Sharpless et al. | Sept. 23, 1952 |
| 2,634,052 | Bloch | Apr. 7, 1953 |
| 2,679,638 | Bensky et al. | May 25, 1954 |
| 2,767,908 | Thomas | Oct. 23, 1956 |
| 2,776,794 | Williams et al. | Jan. 8, 1957 |

FOREIGN PATENTS

| | | |
|---|---|---|
| 678,427 | Great Britain | Sept. 3, 1952 |
| 709,408 | Great Britain | May 26, 1954 |

OTHER REFERENCES

Greenwald et al.: SEAC, Proc. of the I.R.E., October 1953, pp. 1300–1308.

Wilkes: The Use of a Floating Address System for Orders in an Automatic Digital Computer, Proceedings of the Cambridge Philosophical Society, vol. 49, part II, April 1953; pp. 84–89.

Buchholz: The System Design of the IBM Type 701 Computer, Proc. of the I.R.E., October 1953, pp. 1266–1273.

Frizzell: Engineering Description of the IBM Type 701 Computer, Proc. of the I.R.E., October 1953, pp. 1276–1278.

Ross: The Arithmetic Element of the IBM Type 701 Computer, Proc. of the I.R.E., October 1953, pp. 1291, 1292.

West et al.: A Digital Computer for Scientific Applications, Proc. of the I.R.E., December 1948, pp. 1452–1460.

Wilkes et al.: The EDSAC—An Electronic Calculating Machine, Journ. of Scientific Instruments and Physics in Industry, vol. 29, December 1949, pp. 385–391.